United States Patent
Yun

(10) Patent No.: US 9,250,847 B2
(45) Date of Patent: Feb. 2, 2016

(54) IMAGE FORMING METHOD AND APPARATUS USING NEAR FIELD COMMUNICATION

(71) Applicant: Samsung Electronics Co., Ltd., Suwon-si, Gyeonggi-do (KR)

(72) Inventor: Tae-jung Yun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/800,118

(22) Filed: Jul. 15, 2015

(65) Prior Publication Data

US 2015/0317117 A1 Nov. 5, 2015

Related U.S. Application Data

(63) Continuation of application No. 13/956,432, filed on Aug. 1, 2013, now Pat. No. 9,116,652.

(30) Foreign Application Priority Data

Dec. 20, 2012 (KR) .......................... 10-2012-0149760

(51) Int. Cl.
  *G06F 17/24* (2006.01)
  *G06F 3/12* (2006.01)
  *H04W 4/00* (2009.01)
  *H04W 8/00* (2009.01)
  *H04W 76/02* (2009.01)
  *H04B 5/00* (2006.01)
  *H04W 64/00* (2009.01)

(52) U.S. Cl.
  CPC ............ *G06F 3/1292* (2013.01); *H04B 5/0031* (2013.01); *H04W 4/008* (2013.01); *H04W 8/005* (2013.01); *H04W 64/00* (2013.01); *H04W 76/023* (2013.01)

(58) Field of Classification Search
  USPC .......................................... 358/1.15; 715/259
  See application file for complete search history.

(56) References Cited

U.S. PATENT DOCUMENTS

| 7,027,084 | B1 | 4/2006 | Watanabe |
| 2006/0146765 | A1 | 7/2006 | Van De Sluis et al. |
| 2008/0194298 | A1 | 8/2008 | Panabaker et al. |
| 2009/0052348 | A1 | 2/2009 | Kato et al. |
| 2009/0066998 | A1* | 3/2009 | Kato ..................... G01C 21/26 358/1.15 |
| 2009/0244015 | A1 | 10/2009 | Sengupta et al. |
| 2010/0156812 | A1 | 6/2010 | Stallings et al. |
| 2010/0156887 | A1 | 6/2010 | Lindroos et al. |
| 2010/0225962 | A1 | 9/2010 | Okigami et al. |
| 2011/0081923 | A1 | 4/2011 | Forutanpour et al. |

(Continued)

FOREIGN PATENT DOCUMENTS

| KR | 10-2005-0104382 A | 11/2005 |
| KR | 10-2012-0080210 A | 7/2012 |

*Primary Examiner* — Jerome Grant, II
(74) *Attorney, Agent, or Firm* — Jefferson IP Law, LLP

(57) ABSTRACT

An image forming apparatus having at least one of print, scan, copy, fax, and web browsing functions, the image forming apparatus including a near field communication (NFC) module to detect a mobile terminal through NFC, a touch panel to display an interactive screen on which at least one object appears and to receive an input of a gesture with respect to the object from a user, and a control unit to interpret a gesture from the user based on a relative position relationship between the NFC module and the touch panel and to transmit the object to the mobile terminal according to a result of the interpretation of the gesture.

33 Claims, 17 Drawing Sheets

(56) References Cited

U.S. PATENT DOCUMENTS

| | | |
|---|---|---|
| 2011/0090155 A1 | 4/2011 | Caskey et al. |
| 2011/0292445 A1 | 12/2011 | Kato |
| 2012/0075672 A1 | 3/2012 | Oishi |
| 2012/0094598 A1 | 4/2012 | Tysowski |
| 2012/0131458 A1 | 5/2012 | Hayes |
| 2012/0139879 A1 | 6/2012 | Kim et al. |
| 2012/0262756 A1 | 10/2012 | Sasama |
| 2013/0208312 A1 | 8/2013 | Morita |
| 2013/0247117 A1* | 9/2013 | Yamada ............... G08C 17/02 725/93 |
| 2014/0022587 A1 | 1/2014 | Coccia et al. |
| 2014/0085658 A1 | 3/2014 | Fallon et al. |
| 2014/0085663 A1* | 3/2014 | Kavanappillil .... H04N 1/00342 358/1.15 |
| 2014/0113652 A1 | 4/2014 | Maguire |
| 2014/0160029 A1* | 6/2014 | Yuen ................... G06F 3/04886 345/169 |
| 2014/0168205 A1* | 6/2014 | Naveh ................. G06F 3/0485 345/419 |
| 2014/0176991 A1 | 6/2014 | Yun |
| 2014/0221049 A1 | 8/2014 | Kim et al. |
| 2015/0019459 A1 | 1/2015 | Han |

* cited by examiner

NFC tag

| Item | Value |
|---|---|
| Device Name | CLX-4170FW |
| Serial Number | 1234567890 |
| Print Capacity | Color, Mono |
| Scan Capacity | 300, 600 dpi |
| Fax Capacity | 33.6K bps |
| Network Address 1 | 0x0000f0a01234 |
| Network Address 2 | 169.254.12.13 |
| Location | N37.578868, E126.980564 |
| Administrator | Kim Jin Hyung (010-123-1234, j.h.Kim@samsung.com) |

IMAGE FORMING METHOD AND APPARATUS USING NEAR FIELD COMMUNICATION

CROSS-REFERENCE TO RELATED APPLICATIONS

This application is a continuation application of a prior application Ser. No. 13/956,432, filed on Aug. 1, 2013, which claimed the benefit under 35 U.S.C §119(a) of a Korean patent application filed on Dec. 20, 2012 in the Korean Intellectual Property Office and assigned Serial number 10-2012-0149760, the entire disclosure of which is hereby incorporated by reference.

BACKGROUND OF THE INVENTION

1. Field of the Invention

The present general inventive concept relates to an image forming apparatus supporting a near field communication (NFC) function and a method of the image forming apparatus to perform an image forming job in connection with a mobile terminal.

2. Description of the Related Art

Near field communication (NFC) is a contactless short-range wireless communication standard between electronic devices within a short distance of 10 cm with low power consumption by using a frequency of 13.56 MHz, and was developed by the joint work of NXP Semiconductors of Netherlands and Sony of Japan in 2002. A data transfer rate of NFC is 424 Kbps, and NFC has excellent security due to a requirement of close proximity and an advanced encryption technology. NFC forgoes a complicated pairing process to perform recognition between devices, and allows devices to recognize one another within 1/10 second or less. In particular, NFC is a smart card type contactless wireless communication technology where radio frequency identification (RFID) technology is utilized. In addition, NFC is an improvement over RFID technology by allowing a two-way communication as compared to smart cards. NFC has a relatively large memory storage space and offers more variety of services. Accordingly, recently, commercialized electronic devices, such as smartphones and personal computers, in which the NFC technology is used, have been released.

SUMMARY OF THE INVENTION

The present general inventive concept provides an image forming apparatus supporting a near field communication (NFC) function and a method of the image forming apparatus to perform an image forming operation in connection with a mobile terminal.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing an image forming apparatus having at least one of print, scan, copy, fax, and web browsing functions, the image forming apparatus including a near field communication (NFC) module to detect a mobile terminal through NFC, a touch panel to display an interactive screen on which at least one object appears and to receive an input of a gesture of a user regarding the object with respect to the mobile terminal, and a control unit to determine a relative position relationship between the NFC module and the touch panel to establish a location of the mobile terminal with respect to the image forming apparatus and to interpret the gesture from the user to transmit the object from the image forming apparatus to the mobile terminal according to a result of the interpretation of the gesture based on the relative position relationship.

The control unit may transmit the object to the mobile terminal, if the gesture progresses in a direction from the touch panel to the NFC module.

The object appearing on the interactive screen may be one of content stored in the image forming apparatus or a menu item corresponding to a function of the image forming apparatus, and the content may include at least one of a fax document, a scanned document, an e-mail, and a file stored in a document box.

If the object is the menu item corresponding to the function, the control unit may transmit a menu identifier corresponding to the menu item to the mobile terminal, and requests the mobile terminal to display the menu item on a screen of the mobile terminal.

If the object is the content, the control unit may request the mobile terminal to store the content or to execute an application to view or edit the content.

If the object is the content, the control unit may transmit thumbnail or summary information of the content according to a data rate of the content or resize the content prior to transmission of the content.

The image forming apparatus may further include a wireless communication module to perform second wireless communication having a higher data rate than that of the NFC, wherein once the NFC module detects the mobile terminal, the control unit establishes the second wireless communication connection by using the NFC and transmits the object to the mobile terminal through the established second wireless communication connection.

The control unit may perform user authentication with respect to the mobile terminal through the NFC or the second wireless communication connection.

Once a user's gesture progressing in a direction from the NFC module to the touch panel is sensed in the mobile terminal, the control unit may receive a predetermined content displayed on a screen of the mobile terminal from the mobile terminal and may display the received predetermined content on the interactive screen.

The control unit may perform a print job, a fax transmission job, a storing job in a document box, or an e-mail transmission job with respect to the received predetermined content.

The control unit may display, on the interactive screen, a graphic image representing movement of the content from an outer side of the interactive screen to an inner side of the interactive screen.

The foregoing and/or other features and utilities of the present general inventive concept may also be achieved by providing an image forming method for an image forming apparatus having a near field communication (NFC) module and a touch panel, the image forming method including detecting a mobile terminal through NFC using the NFC module, determining a relative position relationship between the NFC module and the touch panel to establish a location of the mobile terminal with respect to the image forming apparatus, displaying an interactive screen on which at least one object appears through the touch panel, and sensing a user's gesture with respect to the object, and interpreting the user's gesture to transmit the object to the mobile terminal according to a result of the interpretation of the gesture based on the relative position relationship.

The transmitting of the object may include transmitting the object to the mobile terminal if the gesture progresses in a direction from the touch panel to the NFC module. The object appearing on the interactive screen may be one of content stored in the image forming apparatus or a menu item to perform a function of the image forming apparatus, and the content may include at least one of a fax document, a scanned document, an e-mail, and a file stored in a document box.

The transmitting of the object if the object is the menu item corresponding to the function may include transmitting a menu identifier corresponding to the menu item to the mobile terminal, and requesting the mobile terminal to display the menu item on a screen of the mobile terminal.

The transmitting of the object if the object is the content may include requesting the mobile terminal to store the content or to execute an application to view or edit the content.

The image forming method may further include establishing second wireless communication connection having a higher data rate than that of the NFC by using the NFC when the mobile terminal is detected by the NFC module, and the transmitting of the object comprises transmitting the object to the mobile terminal through the established second wireless communication connection.

The image forming method may further include performing user authentication with respect to the mobile terminal through the NFC or the second wireless communication connection.

The image forming method may further include receiving a predetermined content displayed on a screen of the mobile terminal from the mobile terminal, once a user's gesture progressing in a direction from the NFC module to the touch panel is sensed in the mobile terminal, displaying the received predetermined content on the interactive screen, and performing a print job, a fax transmission job, a storing job in a document box, or an e-mail transmission job with respect to the received predetermined content.

The displaying of the received predetermined content on the interactive screen may include displaying, on the interactive screen, a graphic image representing movement of the content from an outer side of the interactive screen to an inner side of the interactive screen.

The foregoing and/or other features and utilities of the present general inventive concept may also be achieved by providing a mobile terminal supporting near field communication (NFC), the mobile terminal including a second NFC module to detect an image forming apparatus having a first touch panel and a first NFC module through the NFC, a second touch panel to display an interactive screen on which at least one content appears and to receive an input of a gesture with respect to the content from a user, a control unit to determine a relative position relationship between the first NFC module and the first touch panel to establish a location of the mobile terminal with respect to the image forming apparatus and to interpret the gesture from the user to transmit the object from the mobile terminal to the image forming apparatus according to a result of the interpretation of the gesture based on the relative position relationship.

The control unit may receive an NFC data exchange format (NDEF) message including information about the relative position relationship between the NFC module and the touch panel through the second NFC module, and may transmit the content to the image forming apparatus if the gesture progresses in a direction from the first NFC module of the image forming apparatus to the first touch panel of the image forming apparatus.

The content may include at least one of a still image, a video image, a screen shot, a document, an e-mail, and an address book which are stored in the mobile terminal, a hypertext transfer protocol (HTTP) object and a uniform resource locator (URL) included in a web page, and the control unit may transmit thumbnail or summary information of the content according to a data rate of the content or resize the content prior to transmission of the content.

The control unit may request the image forming apparatus to request perform a print job, a fax transmission job, a storing job in a document box, or an e-mail transmission job with respect to the content.

The mobile terminal may further include a second wireless communication module to perform second wireless communication having a higher data rate than that of the NFC, wherein once the second NFC module detects the image forming apparatus, the control unit establishes second wireless communication connection by using the NFC and transmits the content to the image forming apparatus through the established second wireless communication connection.

If the image forming apparatus senses a user's gesture progressing in a direction from the first touch panel to the first NFC module, the control unit may receive an object which appears on an interactive screen of the first touch panel from the image forming apparatus and displays the received object on the second touch panel.

If the received object is a menu item corresponding to a function of the image forming apparatus, the control unit may receive a menu identifier corresponding to the menu item from the image forming apparatus, and displays the menu item on the second touch panel.

If the received object is a predetermined content stored in the image forming apparatus, the control unit stores the predetermined content or executes an application to view or edit the predetermined content.

The foregoing and/or other features and utilities of the present general inventive concept may also be achieved by providing a method for transmitting and receiving data to and from an image forming apparatus at a mobile terminal supporting near field communication (NFC), the method including detecting the image forming apparatus having a first touch panel and a first NFC module through the NFC using a second NFC module, determining a relative position relationship between the first NFC module and the first touch panel to establish a location of the mobile terminal with respect to the image forming apparatus, displaying an interactive screen on which at least one content appears through a second touch panel and receiving an input of a gesture with respect to the content from a user, and interpreting the user's gesture to transmit the content to the image forming apparatus according to a result of interpretation of the gesture based on the relative position relationship.

The foregoing and/or other features and utilities of the present general inventive concept may also be achieved by providing an image forming apparatus supporting near field communication (NFC), the mobile terminal including a near field communication (NFC) module to detect an external mobile terminal through NFC, and a user interface to allow a user to transmit an object between the image forming apparatus and the external mobile terminal via a gesture of the user corresponding to the image forming apparatus and external the mobile terminal and based on a position of the external mobile terminal with respect to the image forming apparatus.

The position of the mobile terminal with respect to the image forming apparatus may correspond to a position of the NFC module with respect to the user interface.

The image forming apparatus may further include a control unit to associate a position of the NFC module with respect to the user interface with the position of the external mobile terminal with respect to the image forming apparatus.

The control unit may interpret the gesture of the user based on at least one of a distance and direction of the external mobile terminal with respect to the image forming apparatus and to control the transmission of the object based on the interpretation.

The user interface may include an interactive screen to display the object.

The user interface may allow the user to transmit the object from the image forming apparatus to the external mobile terminal based on the gesture, and the user interface may allow a user to receive the object from the external mobile terminal based on another gesture of the user that is substantially opposite from the gesture.

The gesture may include at least one of a movement of the user's hand with respect to the external mobile terminal and the NFC module, a touch of the user's hand on the user interface unit, and a dragging action of the user's hand between the image forming apparatus and the external mobile terminal.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
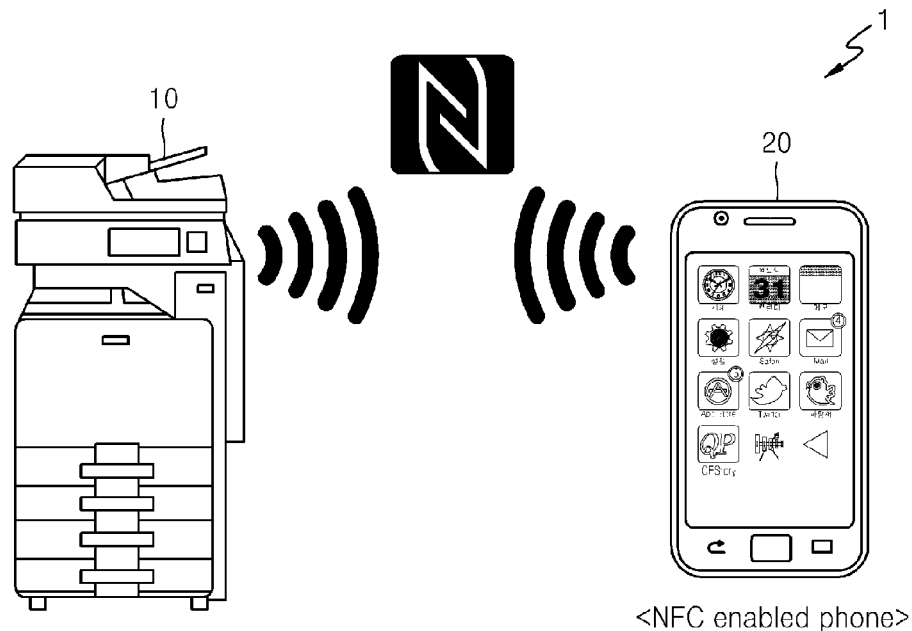
FIG. 1A illustrates a near field communication (NFC) environment according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

In the following embodiments, an image forming apparatus is assumed to be a multi-function printer (MFP) having at least one of printing, scanning, copying, fax transmission, file server, and web browsing functions. A mobile terminal may be implemented in various forms. For example, the mobile terminal described in the specification may include a portable phone, a smart phone, a laptop computer, a digital broadcasting terminal, personal digital assistants (PDA), a portable multimedia player (PMP), a navigation, a tablet personal computer (PC), and so forth.

Throughout the specification, the term "object" means a target which is selectable by a user. Examples of the object may include an icon, a link, a picture, a text, an index item, and so forth. The term "interactive screen" means an image including information or an object. For example, examples of the interactive screen may include a web page, a content list, a thumbnail list, a photo-arranged tray, an icon-arranged tray, a menu-item-arranged tray, and so forth.

Throughout the specification, the term "gesture" means a gesture used by a user to control a mobile terminal. For example, examples of the gesture described in the specification may include a tap, touch & hold, a double tap, a drag, panning, flick, drag and drop, and so forth.

The term "tap" refers to a user's action of very rapidly touching the screen using a finger or a touch tool such as a stylus. That is, the tap corresponds to a case where a very short time exists between a touch-in instant at which the finger or the touch tool touches the screen and a touch-out instant in which the finger or the touch tool is removed from the screen.

The term "touch & hold" refers to a user's action of touching the screen by using a finger or a touch tool and maintaining the touch input for a predetermined threshold time or more. That is, a time difference between the touch-in instant and the touch-out instant is greater than the threshold time. To allow the user to recognize whether the touch input is a tap or touch & hold, a visual or audible feedback signal may be provided if the touch input is maintained for the threshold time or more.

The term "double tap" refers to a user's action of rapidly touching the screen two times by using a finger or a touch tool.

The term "drag" refers to a user's action of touching the screen by using a finger or a touch tool and moving the finger or the touch tool to another position in the screen while maintaining the touch. With the drag action, the object is moved or a panning action to be described below is made.

The term "panning" refers to a user's action of making a drag without selecting an object. Since the panning action does not select any particular object, the object is not moved in the interactive screen; rather, the interactive screen is turned over to the next page or a group including the object is moved in the interactive screen.

The term "flick" refers to a user's action of very rapidly making a drag by using a finger or a touch tool. Based on whether the moving speed of the finger or the touch tool is greater than a threshold speed, a drag (or panning) or a flick may be identified.

The term "drag and drop" refers to a user's action of dragging and then dropping an object at a predetermined position in the screen by using a finger or a touch tool.

FIG. 1A illustrates a near field communication (NFC) environment 1 according to an exemplary embodiment of the present general inventive concept. Referring to FIG. 1A, an image forming apparatus 10 and a mobile terminal 20 that each support an NFC function are present in the NFC environment 1. An NFC chip may be embedded in the image forming apparatus 10 illustrated in FIG. 1 in advance, and thus communication between the image forming apparatus 10 and the mobile terminal 20 may be performed via NFC.

Figure 1B:
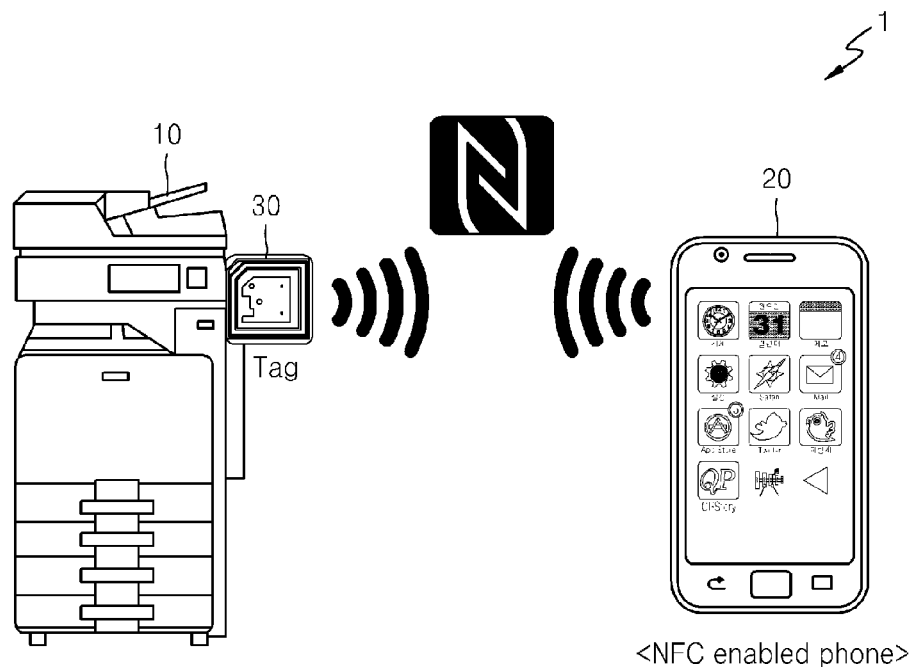
FIG. 1B illustrates an NFC environment similar to that of FIG. 1A, according to another exemplary embodiment of the present general inventive concept.

FIG. 1B illustrates an NFC environment 1 that is similar to the NFC environment 1 FIG. 1A, according to an exemplary embodiment of the present general inventive concept. Referring to FIG. 1B, an image forming apparatus 10 and a mobile terminal 20 that each support an NFC function are also present in the NFC environment 1. In particular, an NFC tag is embedded in advance within the image forming apparatus 10 of FIG. 1A, whereas an NFC tag 30 illustrated in FIG. 1B is not embedded within the image forming apparatus 10 in FIG. 1B in advance.

Accordingly, the image forming apparatus 10 of FIG. 1B may communicate with the mobile terminal 20 via NFC only when an NFC tag 30 is installed later in the image forming apparatus 10 of FIG. 1B.

However, it is obvious to one of ordinary skill in the art that if the NFC tag 30 is installed later in the image forming apparatus 10 of FIG. 1B, then an operation of the NFC environment 1 of FIG. 1B is identical to that of the NFC environment 1 of FIG. 1A, in which the NFC tag 30 is embedded in advance.

While FIGS. 1A and 1B illustrate only one pair of devices within the NFC environment 1, that is, the image forming apparatus 10 and the mobile terminal 20, more electronic devices of various types that support an NFC function may also be present in the NFC environment 1. As such, these other various devices may also operate in the same manner of NFC as in the present exemplary embodiment of the present general inventive concept.

Although the image forming apparatus 10 and the mobile terminal 20 are illustrated in FIGS. 1A and 1B as being spaced apart from each other in different physical spaces in the NFC environment 1, the mobile terminal 20 may be located very close to the NFC tag 30 of the image forming apparatus 10. Accordingly, NFC tag 30 of the image forming apparatus may interpret the mobile terminal 20 as being located in a same position as the NFC tag 30.

Figure 1C:
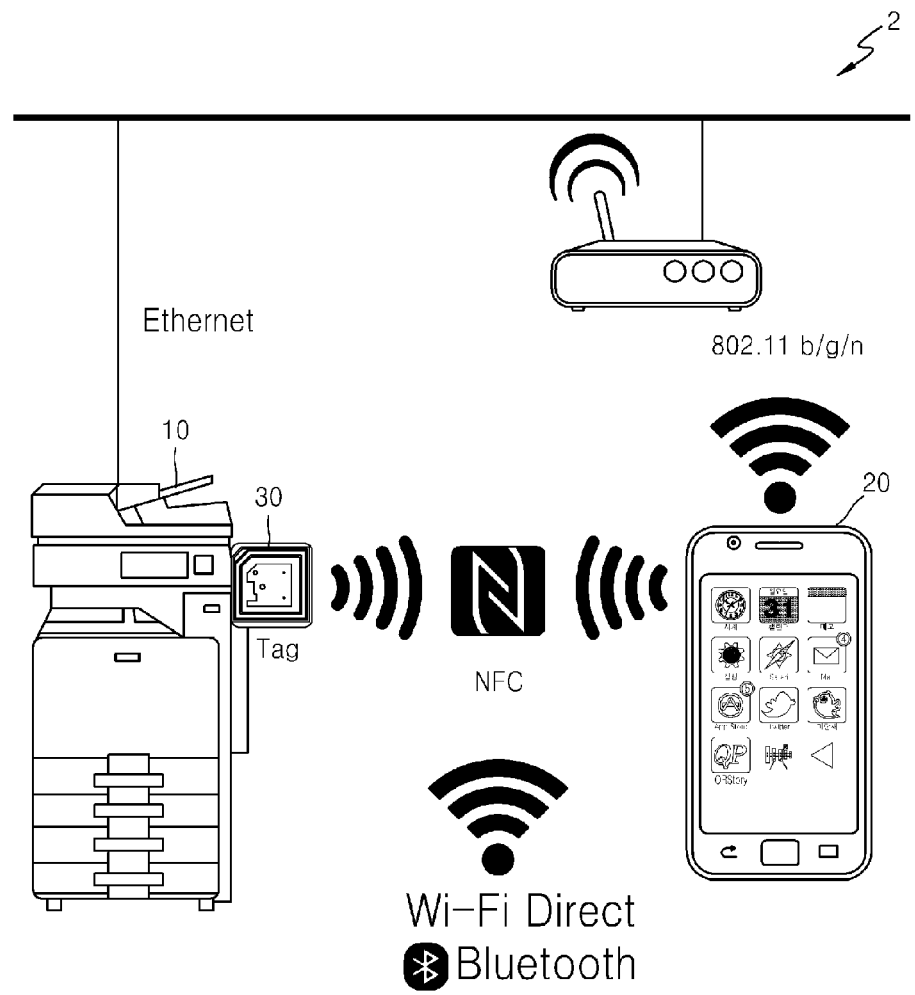
FIG. 1C illustrates a wireless communication environment in which an image forming apparatus and a mobile terminal are present, according to an exemplary embodiment of the present general inventive concept.

FIG. 1C illustrates a wireless communication environment 2 in which an image forming apparatus 10 and a mobile terminal 20 are present, according to an exemplary embodiment of the present general inventive concept. Referring to FIG. 1C, other peripheral wired/wireless networks are illustrated in addition to the NFC environment 1 of FIG. 1A or 1B. The NFC environment 1 may operate in connection with peripheral wired/wireless networks, such as Wi-Fi Direct, Bluetooth, Ethernet, 802.11a/b/g/n, etc., but is not limited thereto.

Before describing the present exemplary embodiment of the present general inventive concept in detail, NFC technology will be described.

NFC is a contactless short-range wireless communication standard between electronic devices within a short distance of 10 cm or less, having a low power consumption by using a frequency of 13.56 MHz. A data transfer rate of NFC is 424 Kbps, and NFC has excellent security due to a requirement of close proximity and an advanced encryption technology. NFC forgoes a complicated pairing process to perform recognition between devices, and allows devices to recognize one another within ¹/₁₀ of a second or less. In particular, NFC may include a smart card type contactless wireless communication technology where radio frequency identification (RFID) technology is utilized. In addition, NFC is an improvement over RFID technology by allowing a two-way communication as compared to RFID smart cards, and has a relatively large memory storage space and offers a larger variety of services and functions.

In detail, NFC is a wireless communication method in which data is directly exchanged between terminals, for example, between the image forming apparatus 10 and the mobile terminal 20, without requiring a separate communication network, and functions similarly as RFID. A wireless communication method using RFID may be classified according to frequencies used. For example, RFID at 13.56 MHz is mainly used for smart cards, such as transit cards or entrance cards, and RFID at 900 MHz is used mainly for logistics. NFC is similar to RFID as it uses a frequency of 13.56 MHz. However, unlike RFID smartcards, which allow only one-way communication, NFC allows two-way communication. Accordingly, NFC is different from RFID smart cards, which function merely as tags that store particular information and transmit the stored information to an RFID reader. NFC also allows a tag function according to necessity, but further supports a function of recording information on the tag, and may be used in peer to peer (P2P) data exchange between terminals in which NFC is set.

Figure 2A:
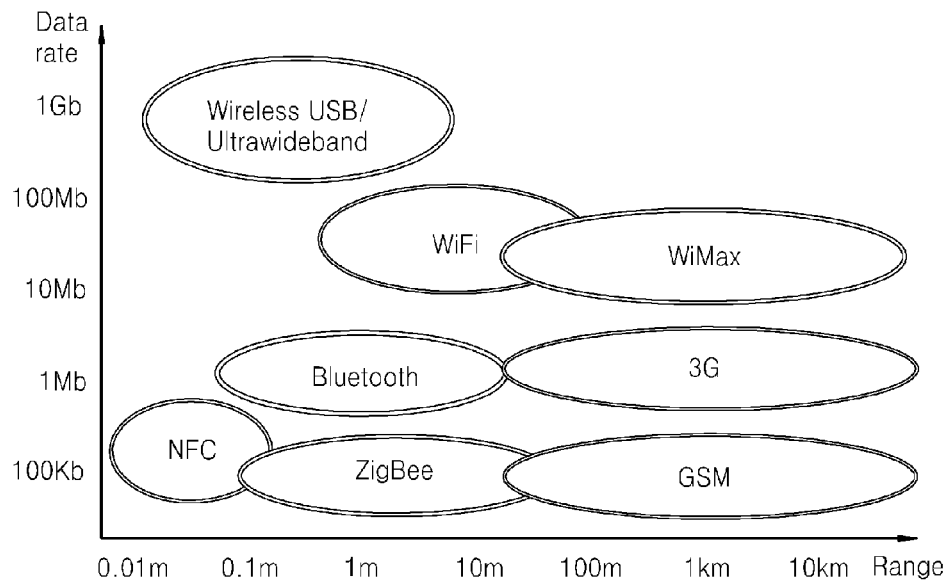
FIG. 2A is a graph comparing data rates and communication ranges of NFC and other wireless communication methods.

NFC, which has been developed based on RFID technology, may be compared with other wireless communication methods, such as Wi-Fi Bluetooth, ZigBee, etc., as illustrated in FIG. 2A.

FIG. 2A is a graph comparing data rates and communication ranges of NFC and other wireless communication methods. Referring to FIG. 2A, compared to other wireless communication methods, NFC may operate at a distance within about 10 cm. Unlike Bluetooth or Wi-Fi, which allow communication in about several to several tens of meters, NFC operates only within an extremely short distance (about 10 cm).

In addition, NFC may be compared to other wireless communication methods, such as Bluetooth, ZigBee, etc., as illustrated in Table 1 below.

TABLE 1

| Technology | Frequency used | security | Standard range | Major service area |
|---|---|---|---|---|
| NFC | 13.56 MHz | Encryption is applied | International Standard | contactless payment, RFID, file transmission |
| Bluetooth | 2.4 GHz | N/A | International Standard | file transmission |

TABLE 1-continued

| Technology | Frequency used | security | Standard range | Major service area |
|---|---|---|---|---|
| ZigBee | 2.4 GHz | N/A | International Standard | device control, RFID |
| 900 MHz RFID | 900 MHz | N/A | Korean standard | RFID |

In other words, compared to other wireless communication methods, NFC operates only within a distance of 10 cm and encryption technology is applied thereto, and thus, a security level of NFC is high. Accordingly, when used in combination with other high-speed wireless communication methods, such as 3G or Wi-Fi, communication between devices via NFC may be performed with a higher efficiency. For example, when NFC and Bluetooth technology are combined, NFC may be used in connecting terminals (authorization) and Bluetooth may be used in data transmission between the terminals to thereby enable more efficient communication between the devices.

Figure 2B:
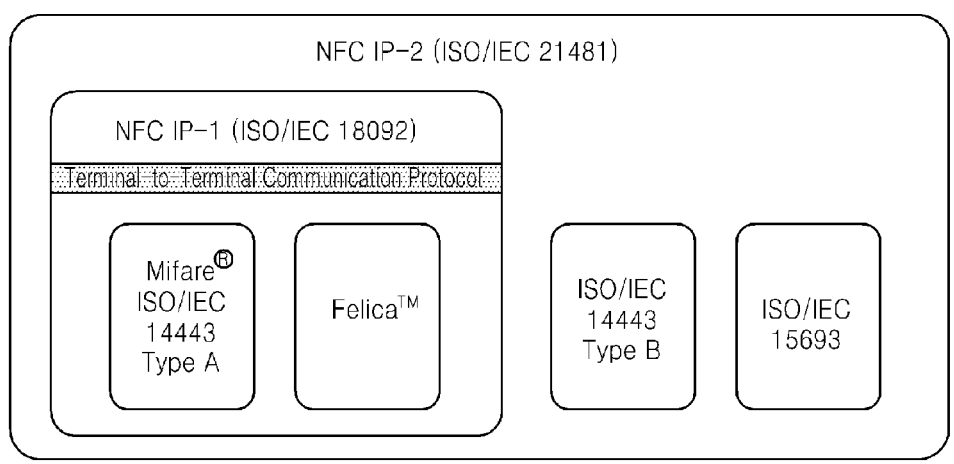
FIG. 2B is a view of standards related to NFC technology.

FIG. 2B is a view of standards related to NFC technology.

Referring to FIG. 2B, NFC standard technology follows International Organization for Standardization (ISO) and is also an extension of ISO 14443 Proximity-card Standard, and here, the inclusion relation of NFC IP-1 (NFC Interface Protocol-1)(ISO/IEC 18092) and NFC IP-2 (ISO/IEC 21481) is illustrated. Here, ISO/IEC 14443 Type A and Type B, FeliCa, and ISO/IEC 15693 are international standards of four areas of contactless cards operating at 13.56 MHz. Also, ISO/IEC 18092 defines communication modes for NFC interface and protocol.

Figure 3A:
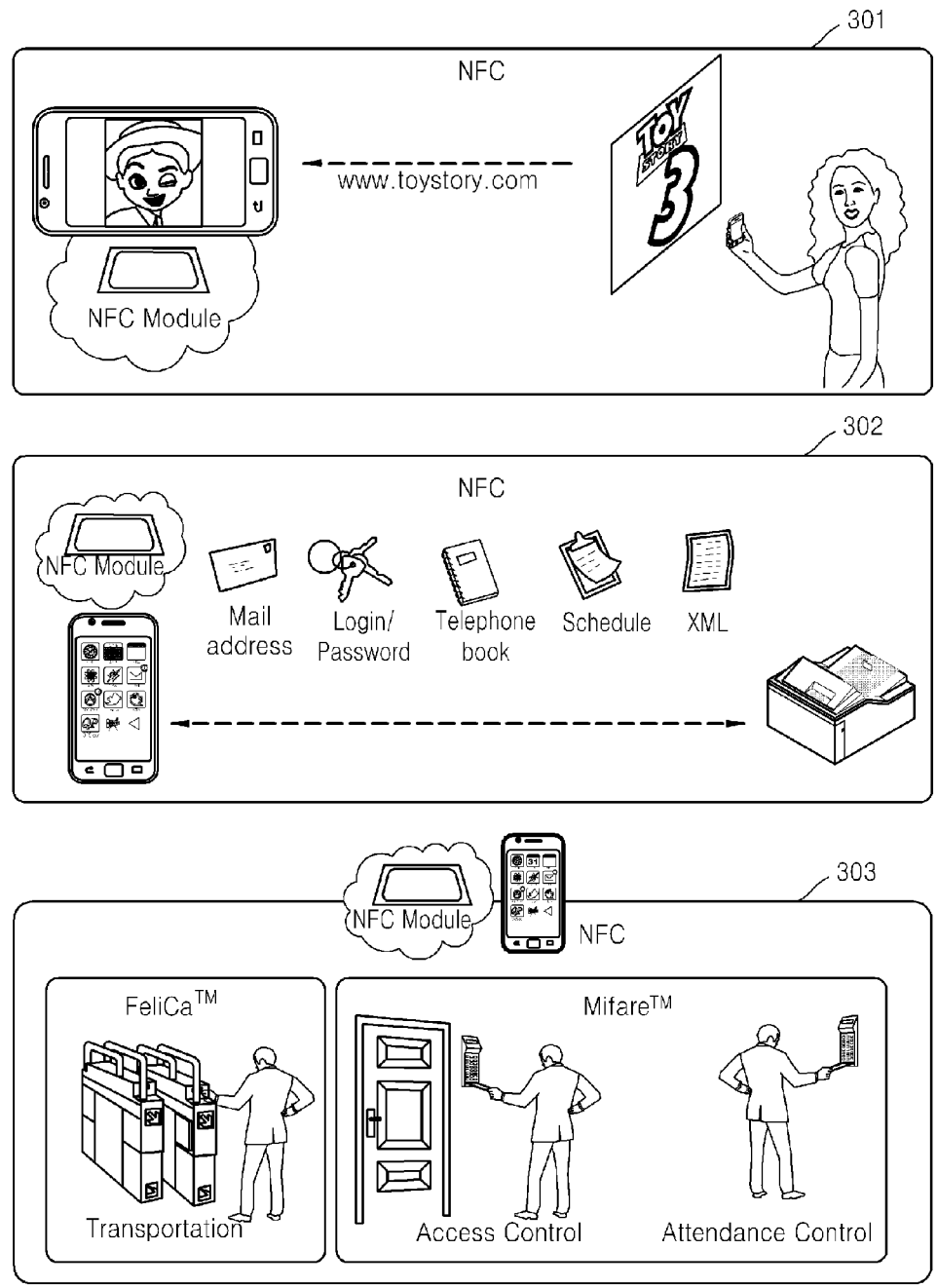
FIGS. 3A and 3B are diagrams illustrating three communication modes of NFC.
Figure 3B:
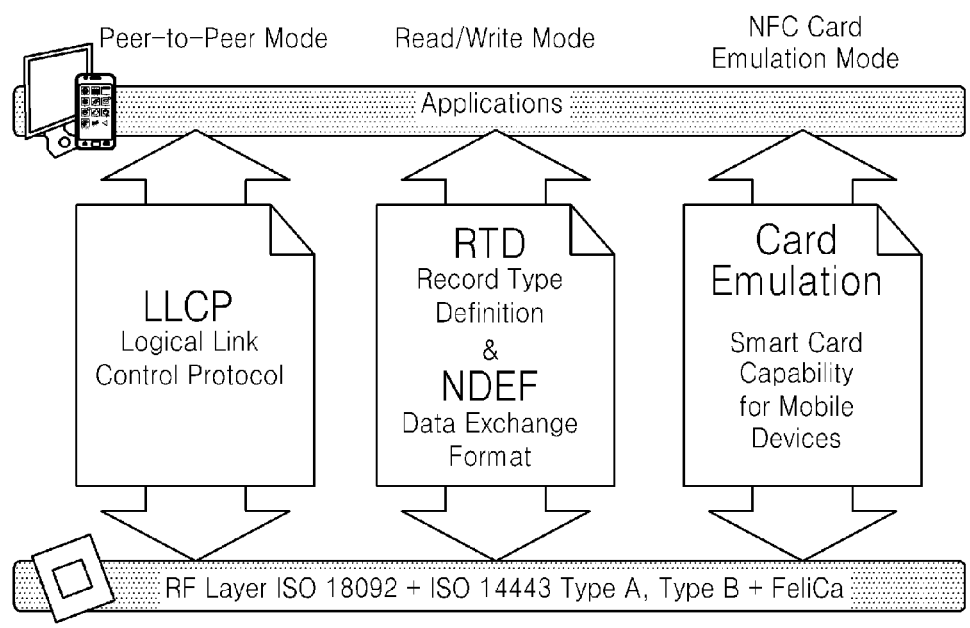

FIGS. 3A and 3B are diagrams illustrating three communication modes of NFC.

Referring to FIG. 3A, the NFC Forum has standardized major NFC communication modes, which are a Reader/Writer mode 301, a P2P mode 302, and a Card Emulation mode 303. In sum, the three communication modes of NFC may be listed as in Table 2 below.

TABLE 2

| | ISO/IEC 15693 | ISO/IEC 18092 | ISO/IEC 14443 |
|---|---|---|---|
| Operational mode | communication between reader and tag (VCD2 mode) | communication between devices (P2P mode) | communication between reader and tag (PCD1 mode) |
| Power supply | Manual | active and manual | manual |
| Range of communication | 1 m | 10-20 cm | 10 cm |
| Data rate | 26 Kbps or less | 106 Kbps, 212 Kbps, 424 Kbps | 106 Kbps |
| Operational mode | communication between reader and tag (VCD2 mode) | communication between devices (P2P mode) | communication between reader and tag (PCD1 mode) |
| Power supply | Manual | active and manual | manual |
| Range of communication | 1 m | 10-20 cm | 10 cm |
| Data rate | 26 Kbps or less | 106 Kbps, 212 Kbps, 424 Kbps | 106 Kbps |

(PCD: Proximity Coupling Device, VCD: Vicinity Coupling Device)

First, the Reader/Writer mode 301 supports that the mobile terminal 20, in which an NFC tag is embedded, operates as a reader to read another NFC tag or operates as a writer to input information to another NFC tag.

In the P2P mode 302, communication at a link level between two NFC terminals, for example, between the image forming apparatus 10 and the mobile terminal 20, is supported. To establish a connection, a client (e g., an NFC P2P initiator, such as the mobile terminal 20) searches to find a host (e.g., an NFC P2P target, such as the image forming apparatus 10) and transmits data of an NDEF message format.

Finally, in the Card Emulation mode 303, the mobile terminal 20, in which an NFC tag is embedded, operates as a smart card (ISO/IEC 14443). Accordingly. NFC is compatible not only with ISO 14443, which is the international standard for contactless cards, but also with FeliCa by Sony and MiFare by Philips.

In order to coordinately provide the three communication modes of NFC, a protocol is standardized as illustrated in FIG. 3B. Referring to FIG. 3B, a software structure in a NFC system is illustrated.

Logical link control protocol (LLCP) is a protocol that sets a communication connection between layers and controls the same. A NFC data exchange format (NDEF) message is a basic message structure defined in an NFC communication protocol. The NDEF is a standard exchange format corresponding to a uniform resource identifier (URI), smart posters, and others, which defines a recording format regarding message exchange between NFC Forum-compatible devices and tags. An NDEF message includes at least one NDEF record. The NDEF record includes a payload that is described according to type, length, and option identifiers. An NDEF payload refers to application data included in an NDEF record. Record type definition (RTD) defines a record type and a type name which may correspond to an NDEF record.

Figure 4:
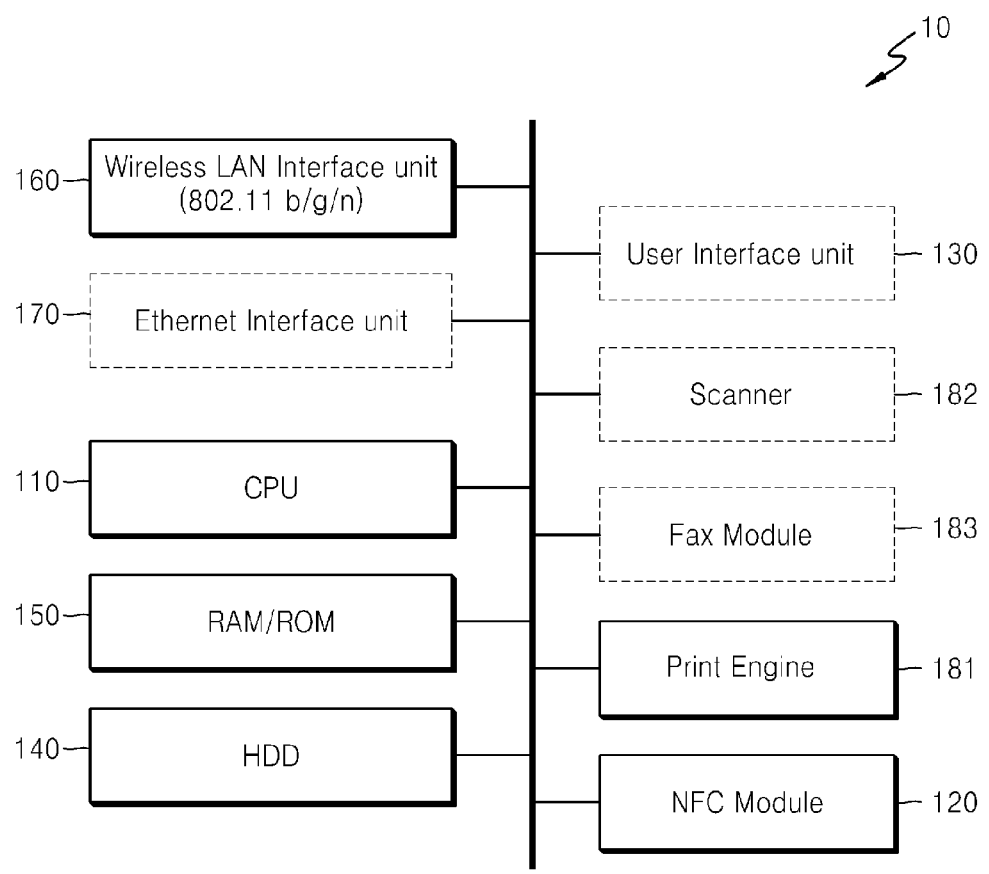
FIG. 4 is a block diagram illustrating a basic hardware structure of an image forming apparatus supporting an NFC function, according to an exemplary embodiment of the present general inventive concept.

FIG. 4 is a block diagram illustrating a basic hardware structure of the image forming apparatus 10 supporting an NFC function, according to an exemplary embodiment of the present general inventive concept. Referring to FIG. 4, the image forming apparatus 10 may include a central processing unit (CPU) 110, an NFC module 120, a user interface unit 130, a hard disk drive (HDD) 140, a random access memory/read only memory (RAM/ROM) 150, a wireless local area network (WLAN) interface unit 160, an Ethernet interface unit 170, a print engine 181, a scanner 182, and a fax module 183. If the image forming apparatus 10 supports only WLAN, the Ethernet interface unit 170 may not be included. Also, if the image forming apparatus 10 is a printer, the scanner 182 and the fax module 183 may not be included.

The CPU 110 controls the overall operation of the image forming apparatus 10, and information needed to control and print data is stored in the HDD 140 and the RAM/ROM 150 and is read therefrom when necessary.

The user interface unit 130 is hardware provided as a medium to allow the user to view and/or check information of the image forming apparatus 10, and input a command to the image forming apparatus 10. The user interface unit 130 may be designed in various manners to correspond appropriate to various products. For example, the user interface unit 130 may be formed in a simple form of two or four lines on a display, such as a liquid crystal display (LCD) or light emitting diode (LED), or as a graphic user interface (GUI), so as to enable various graphical representations. The user interface unit 130 may include a touch panel to sense a user's touch or a motion detector to sense a user's gesture.

The WLAN interface unit 160 refers to hardware that performs IEEE 802.11 b/g/n functionality, and may communicate with a main board of the image forming apparatus 10 via a universal serial bus (USB), etc. The WLAN interface unit 160 may also support Wi-Fi Direct at the same time.

The Ethernet interface unit 170 refers to hardware that performs wired Ethernet communication according to IEEE 802.3.

The print engine 181, the scanner 182, and the fax module 183 refer to hardware to perform a printing function, a scanning function, and a fax function, respectively.

In particular, the image forming apparatus 10 includes the NFC module 120 to thereby communicate with other NFC devices, such as the mobile terminal 20, via NFC. The NFC module 120 is in charge of the NFC function and may read from or write data to an NFC tag. Also, communication with the main board of the image forming apparatus 10 is performed by using a universal asynchronous receiver/transmitter (UART), an inter integrated circuit (I2C), a serial peripheral interface bus (SPI), or the like. As described above with reference to FIGS. 1A and 1B, the NFC module 120 may be embedded in the image forming apparatus 10 in advance at the time of factory shipment, or may be available as the user installs the NFC tag 30 later.

Although not illustrated in FIG. 4, the image forming apparatus 10 may also include other wireless communication modules, such as a Bluetooth module or a ZigBee module, but is not limited thereto.

Figure 5:
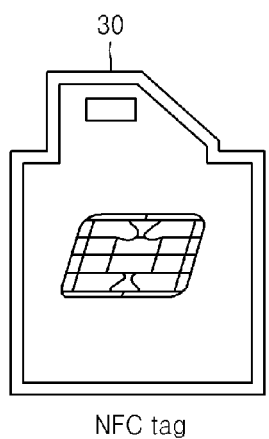
FIG. 5 illustrates an NFC tag and information stored in the NFC tag installed in the image forming apparatus of FIG. 1B.

FIG. 5 illustrates the NFC tag 30 of the image forming apparatus 10 and information 510 stored in the NFC tag 30. Referring to the image forming apparatus 10 of FIG. 1B, the NFC function may be utilized when the NFC tag 30 is inserted into a slot that is provided in advance in the image forming apparatus 10. The information 510 of the NFC tag 30, for example, may include performance information of the image forming apparatus 10, and may be recorded by other NFC devices in the Reader/Writer mode 301 of FIG. 3A, or may be stored in advance by a manager.

In particular, a relative position relationship between the user interface unit 130 and the NFC module 120 may be stored in the NFC tag 30. More specifically, in order to establish a location of the NFC module 120 with respect to the interface unit 30, information about up/down/left/right directions and/or distance between the touch panel included in the user interface unit 130 and the NFC module 120 may be stored in the NFC tag 30. As such, a location of the NFC module 120 with respect to the user interface unit 130, (i.e., the relative position relationship) may be recorded as vector information in the NFC tag 30.

Figure 6:
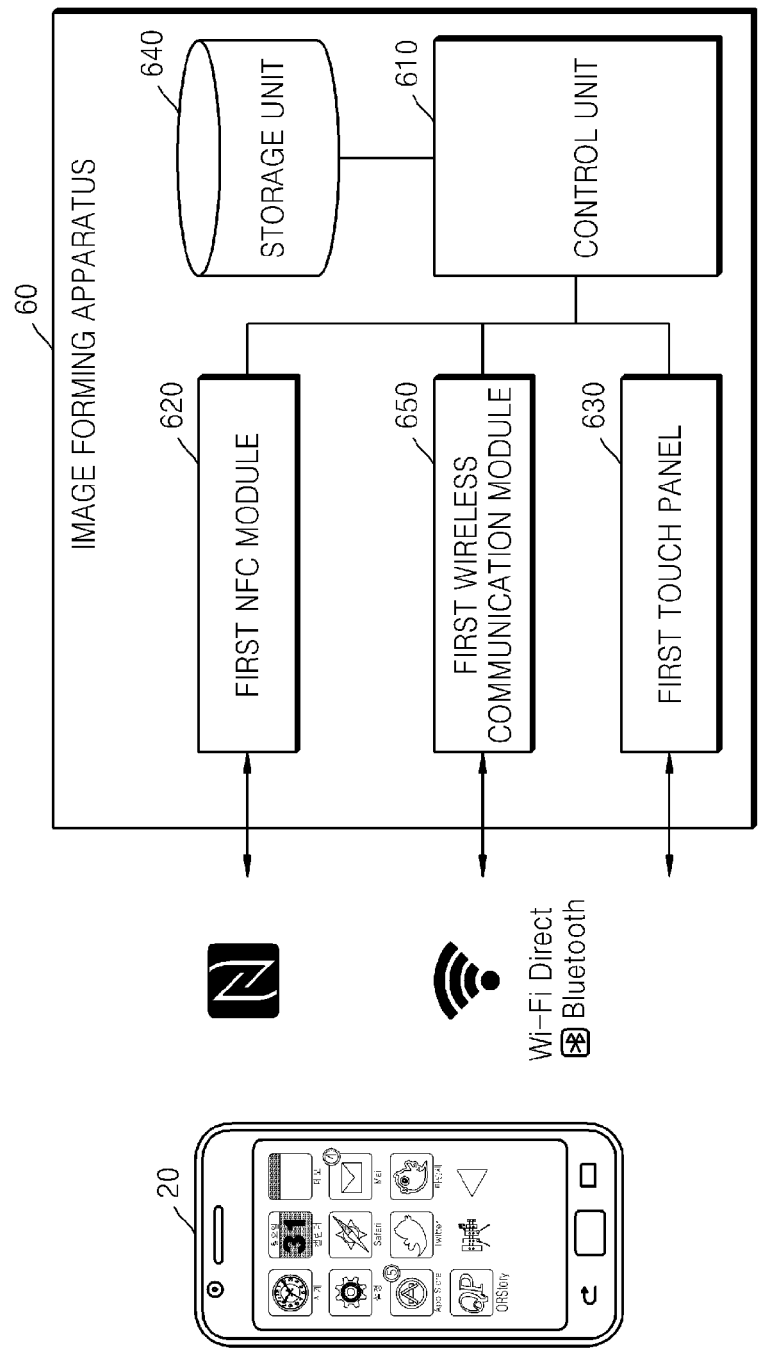
FIG. 6 is a diagram illustrating a structure of an image forming apparatus according to an exemplary embodiment of the present general inventive concept.
Figure 8:
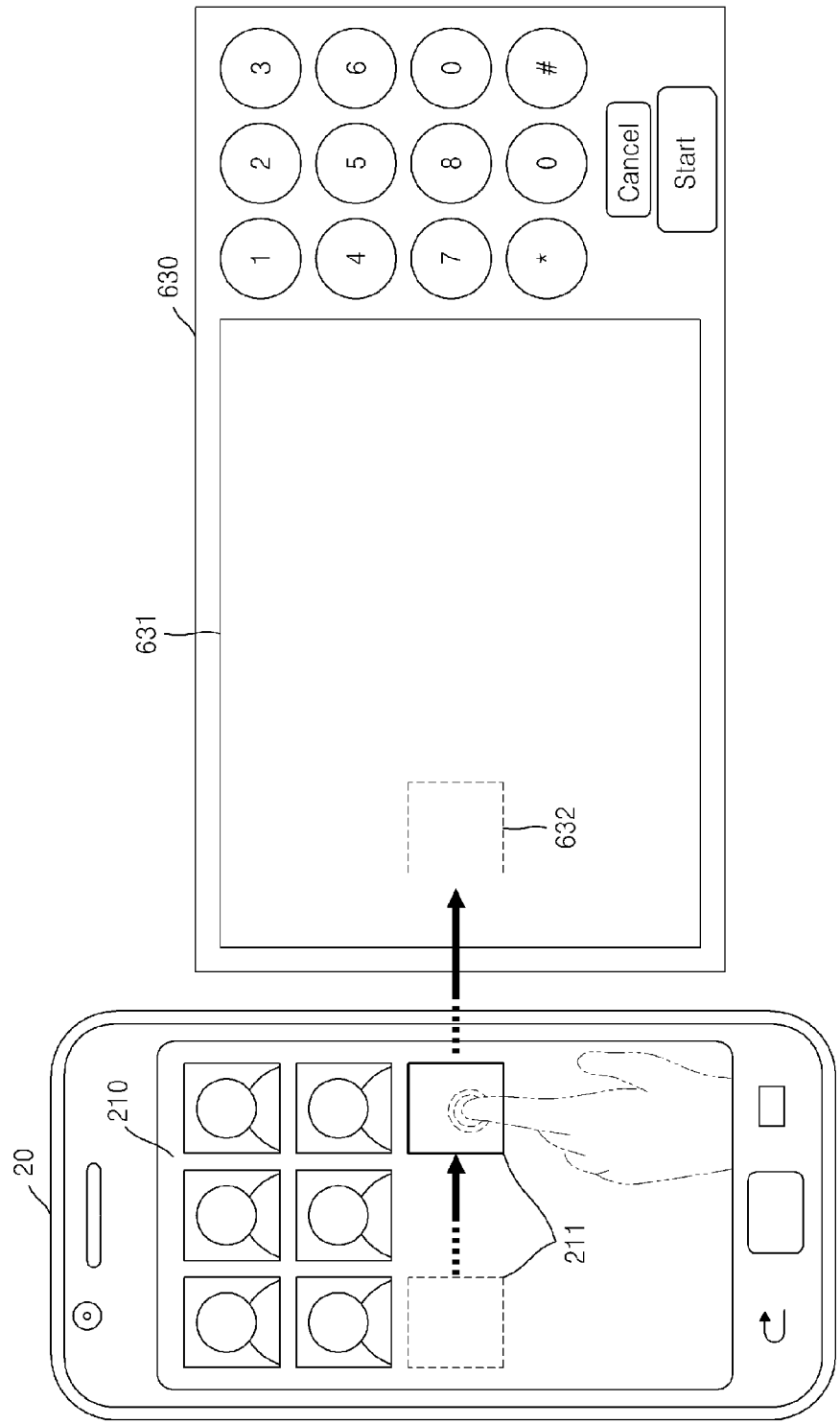
FIGS. 8 through 10 are diagrams illustrating an image forming apparatus and a graphic user interface (GUI) of a mobile terminal according to an exemplary embodiment of the present general inventive concept.

FIG. 6 is a diagram illustrating a structure of an image forming apparatus 60 according to an exemplary embodiment of the present general inventive concept. In FIG. 8, only hardware components related to the present exemplary embodiment will be described for ease of description. However, it is obvious to one of ordinary skill in the art that other general-use hardware components in addition to the illustrated hardware components may also be included.

Referring to FIG. 6, the image forming apparatus 60 s illustrated as including hardware components related only to the present exemplary embodiment, from among the hardware components of the image forming apparatus 10 illustrated in FIG. 4. However, it is obvious to one of ordinary skill in the art that elements that are omitted in FIG. 6 but that are described with reference to the image forming apparatus 10 of FIG. 4 may also be applied to the image forming apparatus 60 according to the present exemplary embodiment.

The image forming apparatus 60 according to the present exemplary embodiment may include a control unit 610, a first NFC module 620, a first touch panel 630, a storage unit 640, and a first wireless communication module 650. In FIG. 6, the control unit 610 corresponds to the CPU 110 of FIG. 4, the first NFC module 620 corresponds to the NFC module 120 of FIG. 4, the first touch panel 630 corresponds to the user interface unit 130 of FIG. 4, and the storage unit 640 corresponds to the HDD 140 of FIG. 4. The first wireless communication module 650 refers to any hardware that uses wireless communication methods other than NFC, such as a WiFi module, a Bluetooth module, a ZigBee module, etc., but is not limited thereto.

The first NFC module 620 detects the mobile terminal 20 through NFC. That is, the first NFC module 620 recognizes access of the mobile terminal 20 having an NFC function according to an NFC protocol. In order to activate the NFC function and set a connection, a predetermined NFC device corresponding to a client (the mobile terminal 20) has to access another NFC device corresponding to a host (the image forming apparatus 60) within a proximity range of 10 cm. The first NFC module 620 may be included in a cradle (not illustrated) of the image forming apparatus 60 on which the mobile terminal 20 may be docked. Thus, the user may establish NFC connection between the mobile terminal 20 and the first NFC module 620 by docking the mobile terminal 20 on the cradle.

As described above, the first NFC module 620 may include the NFC tag 30 illustrated in FIG. 5, and a relative position relationship between the first NFC module 620 and the first touch panel 630 may be recorded in the NFC tag 30. Thus, from information recorded in the NFC tag 30, a location of the first NFC module 620 relative to the first touch panel 630 with respect to distance and direction may be determined. When the NFC connection between the mobile terminal 20 and the first NFC module 620 is established, the control unit 610 may determine that the mobile terminal 20 is situated at a same position and location as the first NFC module 620. Hence, from the information recorded in the NFC tag 30, the position of the mobile terminal 20 may be recognized. In other words, the position of the mobile terminal 20 with respect to the image forming apparatus 60 corresponds to a position of the first NFC module 620 with respect to the first touch panel 630. Also, the image forming apparatus 60 may determine a relative position relationship between the first NFC module 620 and the first touch panel 630 to establish a location of the mobile terminal 20 with respect to the image forming apparatus 60.

During a process of establishing the NFC connection between the first NFC module 620 and the mobile terminal 20, the information recorded in the NFC tag 30 is read by the mobile terminal 20. As stated above, an NDEF message including information about the relative position relationship between the first NFC module 620 and the first touch panel 630 is transmitted to the mobile terminal 20. The NDEF message may further include, but not limited to, information indicating that the image forming apparatus 60 may perform another wireless communication (second wireless communication) through the first wireless communication module 650, a media access control (MAC) address of the image forming apparatus 60, information to perform authentication of a device or a user, and information about an application that must be executed in the mobile terminal 20 (a mobile terminal-dedicated application). The mobile terminal-dedicated application refers to an application to share a GUI with the image forming apparatus 60, to transmit and receive content or menu items to and/or from the image forming apparatus 60, and to execute a function of the image forming apparatus 60, as will be described below. The mobile terminal-dedicated application may be directly executed by a user prior to establishment of the NFC connection, but it may also be set to be automatically executed by the NDEF message during establishment of the NFC connection.

Upon execution of the mobile terminal-dedicated application, in the image forming apparatus 60, an image forming apparatus-dedicated application corresponding to the mobile terminal-dedicated application may be executed. The image forming apparatus-dedicated application may be provided as a bundle of open architecture-based OSGi, and may be executed as a background in the image forming apparatus 60.

Once the mobile terminal 20 is detected by the first NFC module 620 and the NFC connection establishment with the mobile terminal 20 is completed, the control unit 610 may establish second wireless communication connection with the mobile terminal 20 through the first wireless communication module 650. The second wireless communication may be a wireless communication scheme having a higher data rate than NFC. Since NFC is suitable to transmit and receive a small-volume data as illustrated in FIG. 2A, the second wireless communication is more suitable for to transmit large-volume content such as image data. As such, it is beneficial to also include the second wireless communication connection regardless of the establishment of the NFC connection.

Upon completion of the second wireless communication connection, the control unit 610 may perform user authentication with the mobile terminal 20 through the second wireless communication module 650. However, user authentication may also be performed through any of the NFC connection and the second wireless communication connection. In the following description, upon completion of the second wireless communication connection, the image forming apparatus 60 and the mobile terminal 20 are assumed to transmit and receive data therebetween through the second wireless communication connection.

The storage unit 640 stores a fax document, a scanned document, an e-mail, etc., but is not limited thereto. In the storage unit 640, there may be a folder (a document box) generated according to a file server function of the image forming apparatus 60. The document box may include a personalized box generated per user and a common box that may be accessible by any user. The file that may be stored in the document box may include not only the fax document, the scanned document, and the e-mail, but also may include a print job, print data in a PDL language, rendered print data, an image file, and a text document.

The first touch panel 630 may be implemented as a capacitive or resistive touch panel to sense a touch of a user. The first touch panel 630 may include a tactile sensor or a proximity sensor as a sensor to sense a touch or proximity of a user. The tactile sensor refers to a sensor that senses contact of a particular object to an extent to which the human feels or to a higher extent. The tactile sensor may sense various information such as the roughness of a contact surface, the rigidity of a contact object, a temperature of a contact point, and so forth. The proximity sensor refers to a sensor that detects a presence or an absence of an object approaching a predetermined detection surface or an object near the detection surface by using a force of an electromagnetic field or infrared rays without using a mechanical contact. Examples of the proximity sensor may include a transmissive photoelectric sensor, a direct reflective photoelectric sensor, a mirror reflective photoelectric sensor, a high-frequency oscillating proximity sensor, a capacitive proximity sensor, a magnetic proximity sensor, and an infrared proximity sensor, but is not limited thereto.

The first touch panel 630 senses a gesture or a pattern input from the user. For example, the first touch panel 630 may sense a user's gesture such as a drag, a flick, a tap, touch & hold, a double tap, panning, sweep, etc., but is not limited thereto. The first touch panel 630 may sense a progressing direction of a gesture, a speed of the gesture, and a length of the gesture.

Although not illustrated in FIG. 6, a keypad, a dome switch, a jog wheel, a jog switch, and an H/W button may also be provided in the image forming apparatus 60. In particular, the first touch panel 630 may be implemented as a touch screen that forms a mutual layer structure with a liquid crystal panel such as a liquid crystal display (LCD) or a light emitting diode (LED).

The first touch panel 630 displays an interactive screen on which at least one object appears, and receives an input of a gesture with respect to an object from the user. For example, interactive screens illustrated in FIGS. 8 through 11 may be displayed on the first touch panel 630. The object included on the interactive screen may include content stored in the storage unit 640 or a menu item related to the function of the image forming apparatus 60. The menu item related to the function of the image forming apparatus 60 refers to an object that allows the user to select a print, scan, copy, fax transmission, file server, or web browsing function of the image forming apparatus 60, or to make a detailed setting corresponding to the function. The content includes at least one of the fax document, the scanned document, the e-mail, and a file stored in the document box.

The control unit 610 determines a relative position relationship between the first NFC module 620 and the first touch panel 630 to establish a location of the mobile terminal 20 with respect to the image forming apparatus 60. As described above, the relative position relationship may be determined using the information recorded in the NFC tag 30. The control unit 610 interprets the gesture input from the user to the first touch panel 630 based on the relative position relationship between the first NFC module 620 and the first touch panel 630. The control unit 610 transmits the object selected by the gesture to the mobile terminal 20 according to the result of interpretation of the gesture. In other words, the control unit 610 associate a position of the first NFC module 620 with respect to the first touch panel 630 with the position of the mobile terminal 20 with respect to the image forming apparatus 60. The control unit 610 interprets the gesture of the user based on at least one of a distance and direction of the mobile terminal 20 with respect to the image forming apparatus 60 and controls the transmission of the object based on the interpretation.

Figure 7:
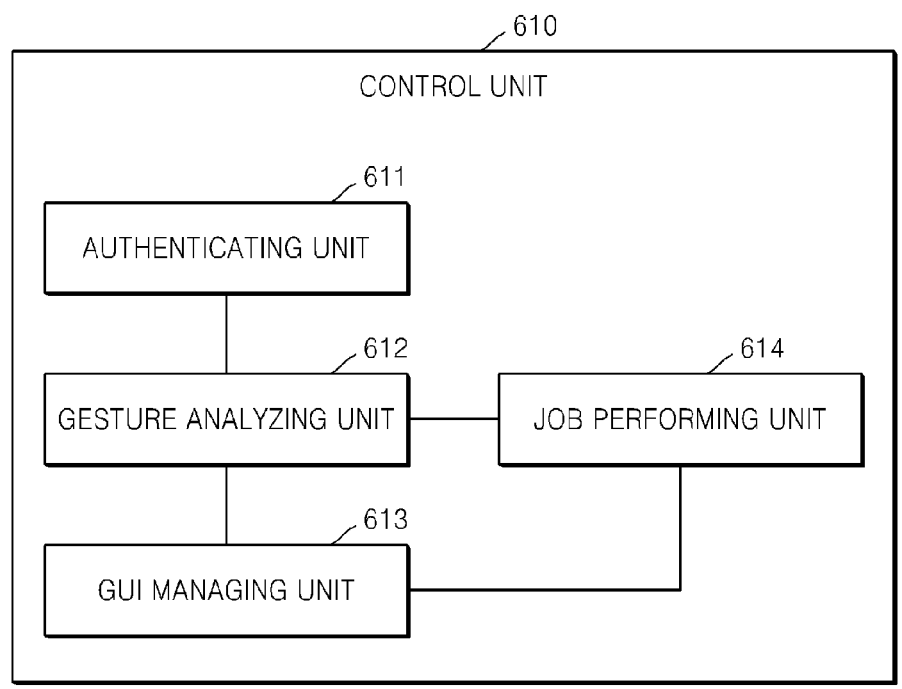
FIG. 7 is a block diagram illustrating a control unit of the image forming apparatus of FIG. 6.

Referring to FIG. 7, the control unit 610 will be described in more detail. The control unit 610 may include an authenticating unit 611, a gesture analyzing unit 612, a GUI managing unit 613, and a job performing unit 614.

The authenticating unit 611 performs user authentication with respect to the image forming apparatus 60. The image forming apparatus 60 may request an identification (ID) and a password to allow only an authorized user to use the image forming apparatus 60. Information about user accounts may be stored in the storage unit 640. A different authority may be allocated to a different user account. For example, regarding a particular user account, a number of prints may be limited or a copy function may be prohibited.

The authenticating unit 611 may perform device authentication as well as user authentication. Once the mobile terminal 20 is detected by the first NFC module 620, the authenticating unit 611 may determine whether the mobile terminal 20 is a device registered in the image forming apparatus 60. As ID information of the mobile terminal 20, a MAC address of the mobile terminal, but not limited thereto, 20 may be used. The authenticating unit 611 may determine whether the mobile terminal 20 is a device suitable to perform an image forming method according to the present general inventive concept. For example, the authenticating unit 611 may determine whether the mobile terminal 20 is a device that supports second wireless communication. The authenticating unit 611 may also determine whether the mobile terminal 20 is a device suitable to perform an image forming apparatus according to the present general inventive concept, by comparing a model number of the mobile terminal 20 with a model number previously stored in the storage unit 640. The authenticating unit 611 may perform authentication prior to the establishment of the NFC connection, prior to the establishment of the4 second wireless communication connection after establishment of the NFC connection, or after the establishment of NFC connection.

Meanwhile, as will be described below, the mobile terminal 20 may also request user or device authentication of the image forming apparatus 60, and the authenticating unit 611 may provide predetermined authentication information requested by the mobile terminal 20 to the mobile terminal 20.

The gesture analyzing unit 612 analyzes a user's gesture input to the first touch panel 630. The gesture analyzing unit 612 may analyze a gesture based on a progressing direction of a gesture, a number of times of input of the gesture, a speed of the gesture, and a contact time of the gesture. The gesture analyzing unit 612 interprets the user's gesture based on a relative position relationship between the first NFC module 620 and the first touch panel 630. For example, if the user's gesture is a gesture to move an object on an interactive screen, the gesture analyzing unit 612 analyzes whether the progressing direction of the gesture is from the first touch panel 630 to the first NFC module 620. The gesture analyzing unit 612 converts the analyzed gesture into a command of the image forming apparatus 60. For example, if a gesture to move an object in a direction from the first touch panel 630 to the first NFC module 620 is input to the first touch panel 630, the gesture analyzing unit 612 converts the gesture into a command to transmit the object to the mobile terminal 20.

On the other hand, upon input of a gesture to move an object in a direction from the first NFC module 620 to the first touch panel 630 into the first touch panel 630, the gesture analyzing unit 612 may convert the gesture into a command to delete the object. In another exemplary embodiment, if a gesture to move an object orthogonally to a direction from the first NFC module 620 to the first touch panel 630 is input into the first touch panel 630, the gesture analyzing unit 612 may convert the gesture into a command to turn over the interactive screen to a previous page or a next page. The foregoing exemplary embodiments are merely provided for convenience of description, and those of ordinary skill in the art may understand that various commands may be mapped according to the progressing direction of a gesture, the number of times of input of the gesture, the speed of the gesture, and the contact time of the gesture.

The GUI managing unit 613 manages the interactive screen displayed on the first touch panel 630. That is, the GUI managing unit 613 generates or changes a GUI and displays a graphic image corresponding to the input user's gesture on the interactive screen. For example, when the job performing unit 614 transmits an object on the interactive screen to the mobile terminal 20, the GUI managing unit 613 may display a graphic image representing movement of the object from an inner side of the interactive screen to an outer side of the interactive screen on the interactive screen. In contrast, upon receipt of content from the mobile terminal 20, the GUI managing unit 613 displays a graphic image representing movement of content from an outer side of the interactive screen to an inner side of the interactive screen on the interactive screen.

The GUI managing unit 613 may delete the object transmitted to the mobile terminal 20 from the interactive screen. For example, if a predetermined menu item is transmitted to the mobile terminal 20, the GUI managing unit 613 may delete the menu item from the interactive screen such that the predetermined menu item does not appear on the first touch panel 630.

If the object may not be transmitted as in case of a failure in authentication of the authenticating unit 611 or an insufficient storage space of the mobile terminal 20, the GUI managing unit 613 may display the graphic image indicating that the object may not be transmitted on the interactive screen. That is, the GUI managing unit 613 may display, on the interactive screen, a graphic image in which the transmission target object does not move along the user's gesture, does not cross a boundary of the interactive screen, or is bounced from the boundary of the interactive screen.

The job performing unit 614 performs an image forming job. In the present general inventive concept, the image forming job includes not only jobs such as print, scan, copy, and fax transmission, but also may include an object transmission/reception job. The job performing unit 614 transmits the object displayed on the interactive screen to the mobile terminal 20 according to a result of analysis of the gesture by the gesture analyzing unit 612. The object may be transmitted through the first wireless communication module 650. Once the gesture analyzing unit 612 forwards a command to transmit the object to the mobile terminal 20 to the job performing unit 614, the job performing unit 614 determines whether the transmission target object is content or a menu item.

The job performing unit 614 transmits content to the mobile terminal 20 if the transmission target object is the content; if the transmission target object is a menu item, the job performing unit 614 transmits a menu identifier corresponding to the menu item to the mobile terminal 20. The transmission of the menu identifier may be performed with displaying a graphic image representing a movement of the menu item on the interactive screen. Therefore, the transmission of the menu identifier is referred to as transmission of the menu item.

When transmitting content, the job performing unit 614 may request the mobile terminal 20 to execute an application to view or edit the content. The job performing unit 614 may transmit thumbnail or summary information of the content according to a data rate or size of the content, or may resize the content prior to transmission. When determining that second wireless communication is not smooth, the job performing unit 614 may scale down or encode a transmission target image prior to transmission or may transmit some pages of a transmission target document. The content transmitted by the job performing unit 614 is to be stored in a predetermined region of the mobile terminal 20.

When transmitting a menu item, the job performing unit 614 transmits a menu identifier corresponding to the menu item. Once transmitting the menu item, the job performing unit 614 may request the GUI managing unit 613 to delete the transmitted menu item from the interactive screen.

The object transmitted from the image forming apparatus 60 is displayed on the screen of the mobile device 20. Thus, the GUI of the image forming apparatus 60 may be seamlessly extended.

Figure 9:
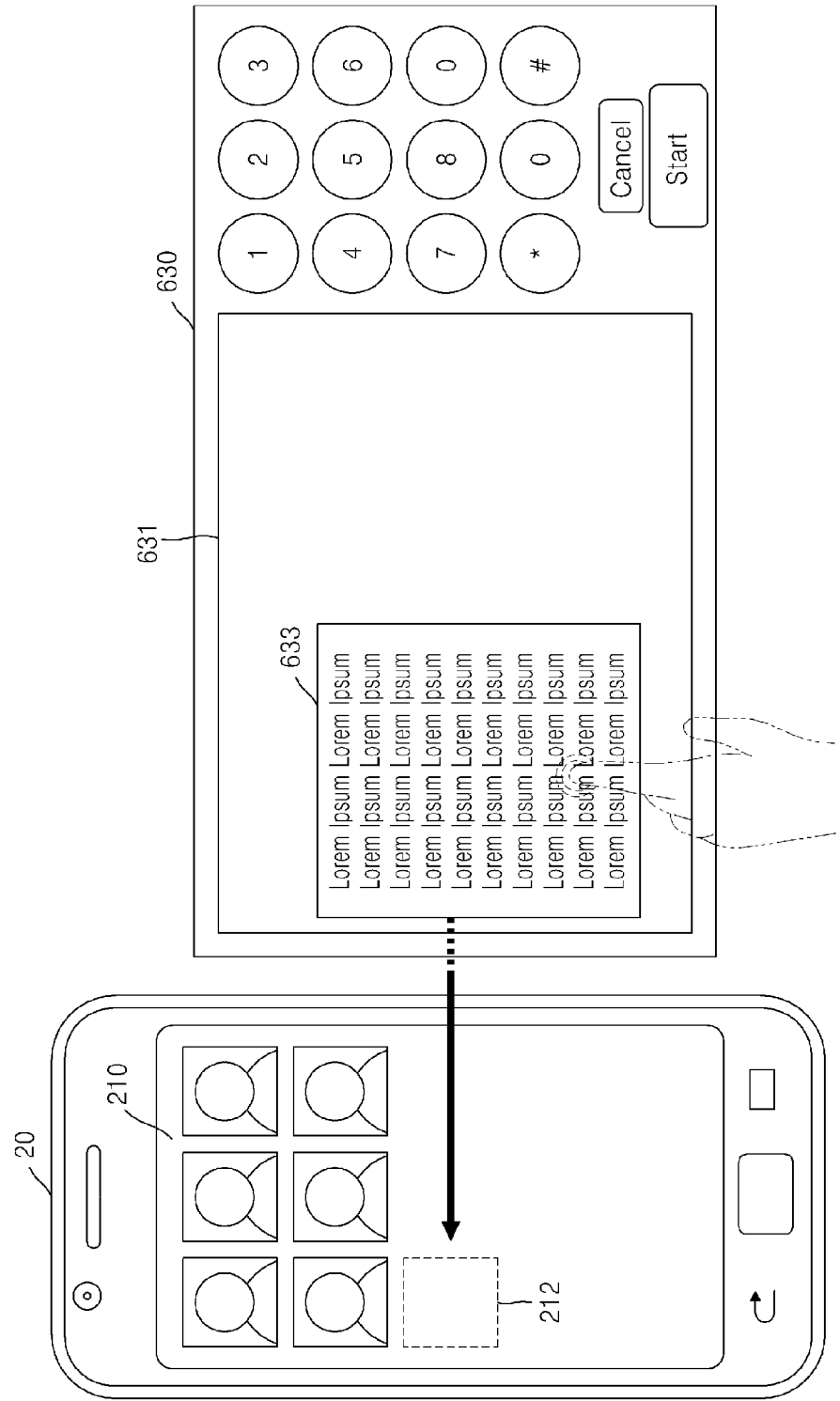
Figure 10:
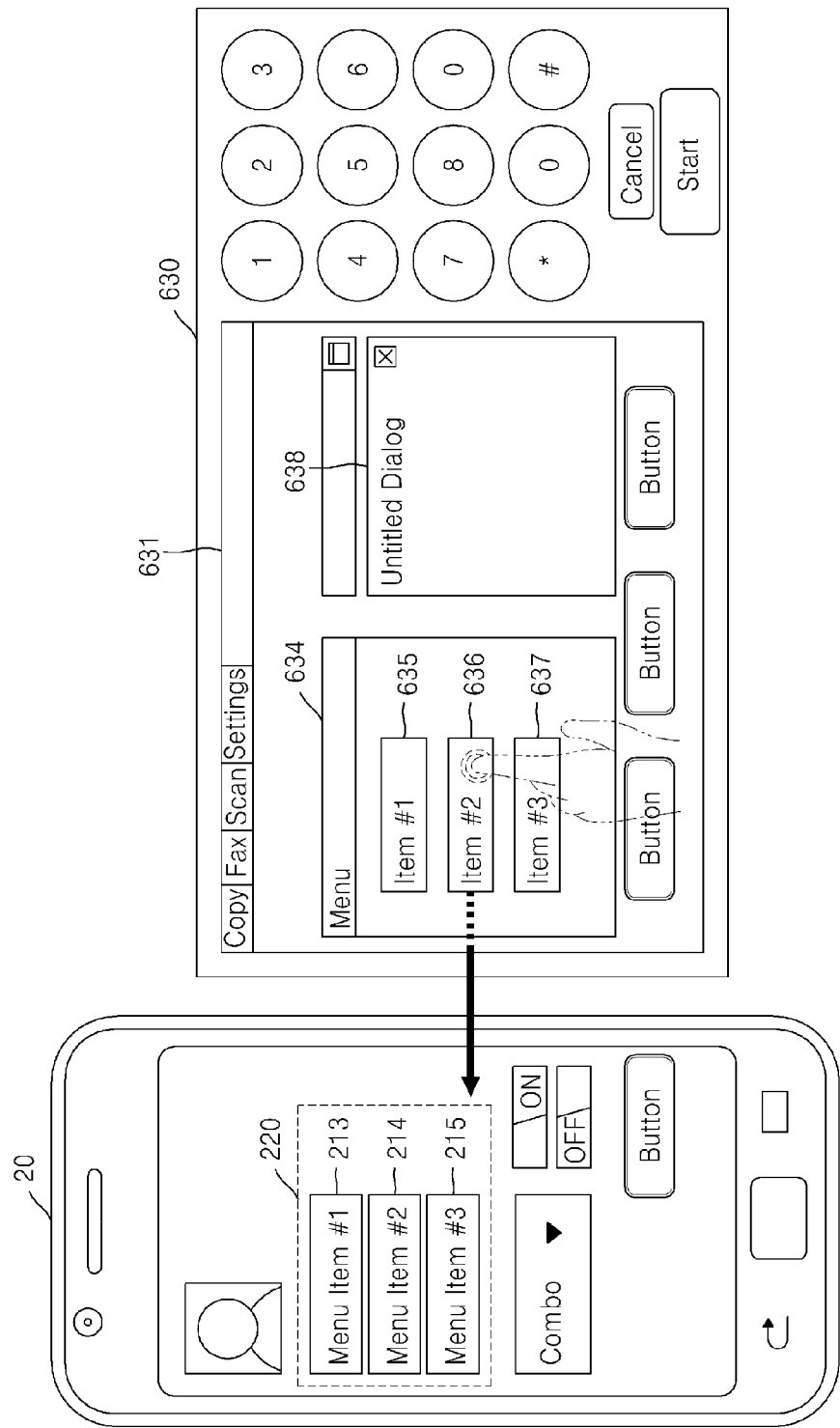

FIGS. 9 and 10 are diagrams illustrating GUIs in which content and a menu item are transmitted from the image forming apparatus 60, respectively. In FIGS. 9 and 10, the mobile terminal 20 is located on the first NFC module 620 of the image forming apparatus 60.

Referring to FIG. 9, an interactive screen 631 is displayed on the first touch panel 630, and content 633 is displayed on the interactive screen 631. The content 633 is assumed to be a scanned document scanned by the image forming apparatus 60. The user touches the content 633 and drags and drops the content 633 in a direction from the first touch panel 630 to the mobile terminal 20. The image forming apparatus 60 transmits the content 633 to the mobile terminal 20. As a result, the transmitted content 633 is stored in the mobile terminal 20, and a size-reduced image 212 of the content 633 is displayed on the mobile terminal 20. To show an effect of integrating the interactive screen 631 with a screen 210 of the mobile terminal 20, a graphic image in which the image 212 moves from the left to the right on the screen 210 of the mobile terminal 20 may be displayed on the mobile terminal 20.

Referring to FIG. 10, the interactive screen 631 is displayed on the first touch panel 630 and a menu 634 including menu items 635, 636, and 637 are displayed on the interactive screen 631. The menu items 635, 636, and 637 may include menu items corresponding to one of copy, scan, fax, and detailed settings of the image forming apparatus 60. As illustrated in FIG. 10, the user touches the menu item 636 and drags and drops the menu item 636 in a direction from the first touch panel 630 to the mobile terminal 20. The image forming apparatus 60 transmits a menu identifier corresponding to the menu item 636 to the mobile terminal 20. As a result, a menu item 214 is displayed on the mobile terminal 20. After transmission, the menu item 636 may be deleted from the interactive screen 631. The menu item 214 may be displayed in the same form as the menu item 636. On the other hand, the menu item 214 may be displayed as a size-reduced or transformed shortcut of the menu item 636. Also, a descriptive menu 638 corresponding to the menu 634 may also be included on the interactive screen 631.

If the user touches one of menu items 213, 214, or 215 that are listed within a menu 220 on the mobile terminal 20, and then drags and drops the menu item 214 in a direction toward the first touch panel 630, the menu item 214 is deleted from the screen of the mobile terminal 20. A menu identifier corresponding to the menu item 214 is transmitted to the image forming apparatus 60, and the deleted menu item 636 is displayed on the interactive screen 631.

Once the user selects and executes one of menu items on the mobile terminal 20, a menu identifier corresponding to the selected menu item is transmitted to the image forming apparatus 60. The image forming apparatus 60 performs a predetermined job corresponding to that menu item. Thus, even if the interactive screen 631 of the image forming apparatus 60 is turned over to another page, the user may easily execute a menu by selecting the menu items 220 displayed on the mobile terminal 20.

Once a user's gesture progressing in a direction from the first NFC module 620 to the first touch panel 630 is sensed on the mobile terminal 20, the job performing unit 614 receives predetermined content displayed on the screen of the mobile terminal 20 from the mobile terminal 20. The GUI managing unit 613 displays the received predetermined content on the interactive screen 631. The GUI managing unit 613 may display a graphic image representing movement of the received content from an outer side of the interactive screen 631 to an inner side of the interactive screen 631 on the interactive screen 631. The job performing unit 614 may perform at least one of a print job corresponding to the received predetermined content, a fax transmission job corresponding to the received predetermined content, a job of storing the received predetermined content in a document box, and a job of transmitting the received predetermined content via an e-mail. Thus, the user may immediately perform a predetermined image forming job within the image forming apparatus 60 merely with an input of a user's touch and/or gesture into the mobile terminal 20.

FIG. 8 is a diagram illustrating an exemplary embodiment of the present general inventive concept in which content is transmitted from the mobile terminal 20 to the image forming apparatus 60. Referring to FIG. 8, multiple contents are displayed on the screen 210 of the mobile terminal 20. The content displayed on the mobile terminal 20 may include at least one of, for example, a still image, a video image, a screen shot, a document, an e-mail, and an address book that are stored in the mobile terminal 20, and a hypertext transfer protocol (HTTP) object and a uniform resource locator (URL) included in a web page, as will be described in detail with reference to FIG. 11. In FIG. 8, the mobile terminal 20 is located on the first NFC module 620 of the image forming apparatus 60.

Referring to FIG. 8, the user drags and drops content 211 in a direction from the mobile terminal 20 that is located on the first NFC module 620 of the image forming apparatus 60 to the first touch panel 630 of the image forming apparatus 60. The mobile terminal 20 transmits the content 211 to the image forming apparatus 60. As a result, the content 211 is displayed as an object 632 of the interactive screen 631 of the image forming apparatus 60. The image forming apparatus 60 prints the content 211, or may be implemented to perform a job other than the print job.

Figure 11:
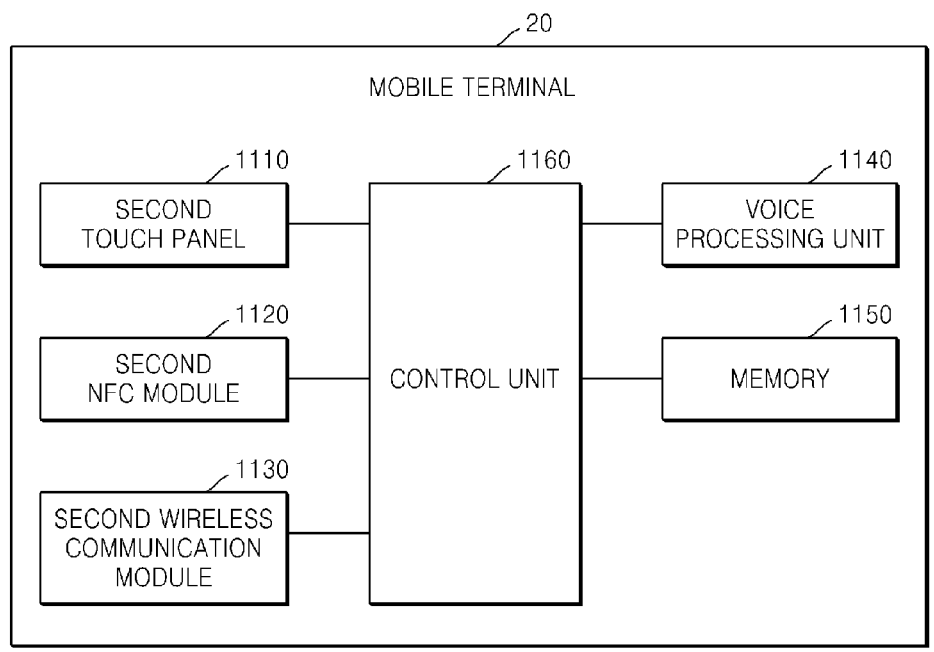
FIG. 11 is a block diagram illustrating a mobile terminal according to an exemplary embodiment of the present general inventive concept.

FIG. 11 is a block diagram illustrating the mobile terminal 20 according to an exemplary embodiment of the present general inventive concept. Components illustrated in the exemplary embodiment of FIG. 11 that are also included in FIGS. 1 through 10 will not have repeated descriptions thereof. In FIG. 11, the mobile terminal 20 is assumed to be a smartphone. Referring to FIG. 11, the mobile terminal 20 may include a second touch panel 1110, a second NFC module 1120, a second wireless communication module 1130, a voice processing unit 1140, a memory 1150, and a control unit 1160.

The second NFC module 1120 detects the image forming apparatus 60 having the first touch panel 630 and the first NFC module 620 via NFC. The second NFC module 1120 is a component corresponding to the first NFC module 620 of the image forming apparatus 60, and a detailed description thereof will refer to the description of the first NFC module 620. The second NFC module 1120 receives an NDEF message including information about a relative position relationship between the first NFC module 620 and the first touch panel 630.

The second touch panel 1110 displays an interactive screen on which at least one content appears, and receives an input of a gesture with respect to the content from the user. The content may include at least one of a still image, a video image, a screen shot, a document, an e-mail, and an address book, an HTTP object included in a web page, and an URL stored in the mobile terminal 20. The second touch panel 1110 is a component corresponding to the first touch panel 630 of the image forming apparatus 60, and a detailed description thereof will refer to the description of the first touch panel 630.

The second wireless communication module 1130 establishes second wireless communication connection with the image forming apparatus 60. A detailed description of the second wireless communication module 1130 will refer to the description of the first wireless communication module 650 of the image forming apparatus 60.

Once the image forming apparatus 60 is detected by the second NFC module 1120, the control unit 1160 transmits and receives information necessary to perform second wireless communication connection with the image forming apparatus 60 through NFC. Upon establishment of second wireless communication connection, the control unit 1160 transmits content that will be described later to the image forming apparatus 60 through second wireless communication connection.

The voice processing unit 1140 converts voice data into an audible sound and outputs the audible sound through a speaker (not illustrated), and converts a voice signal received from a microphone (not illustrated) into data and outputs the data. If the mobile terminal 20 is not a smartphone, the voice processing unit 1140 may be omitted.

In the memory 1150, an operating program and an application of the mobile terminal 20 are stored.

The control unit 1160 interprets a user's gesture based on a relative position relationship between the first NFC module 620 and the first touch panel 630 of the image forming apparatus 60, and transmits content to the image forming apparatus 60 according to a result of an interpretation of the gesture. The control unit 1160 transmits the content to the image forming apparatus 60, if the gesture input to the second touch panel 1110 is in a direction from the first NFC module 620 of the image forming apparatus 60 to the first touch panel 630 of the image forming apparatus 60. The control unit 1160 may transmit thumbnail or summary information of the content according to a data rate of the content or may change the size of the content prior to transmission.

If the content is a video image, the control unit 1160 may capture a still image of the video image at a point in time of input of the gesture and may transmit the captured still image to the image forming apparatus 60. The content may also be immediately generated and transmitted from a camera module (not illustrated) provided in the mobile terminal 20. That is, the mobile terminal 20 may capture a picture at a point in time of input of the gesture and transmit the picture to the image forming apparatus 60. The content may be a screen shot of the screen displayed by the mobile terminal 20. The mobile terminal 20 may generate a screen shot of the screen at a point in time of input of the gesture and transmit the generated screen shot to the image forming apparatus 60. The content may be a web page that the mobile terminal 20 is accessing or an HTTP object included in the web page. The mobile terminal 20 may transmit the web page or a script of the HTTP object or transmit a URL of a web page or HTTP object to the image forming apparatus 60. The content may further include, but not limited to, an address book of the mobile terminal 20 and an e-mail.

The control unit 1160, when transmitting content to the image forming apparatus 60, may request the image forming apparatus 60 to perform a print job or a fax transmission job of the content, a job of storing the content in a document box, or an e-mail transmission job of the content.

The control unit 1160 may perform user or device authentication with the image forming apparatus 60 as described with reference to FIG. 6. If authentication fails, the storage space of the image forming apparatus 60 is not sufficient, or the content is in a file format that is not supported by the image forming apparatus 60, the control unit 1160 may display, on the interactive screen, a graphic image indicating that the content may not be transmitted. That is, the control unit 1160 may display, on the interactive screen, a graphic image in which transmission target content does not move along the user's gesture or does not cross the boundary of the interactive screen, or the moving gesture is bounced from the boundary of the interactive screen.

Once the user's gesture progressing in a direction from the first touch panel 630 of the image forming apparatus 60 to the first NFC module 620 of the image forming apparatus 60 is sensed by the image forming apparatus 60, the control unit 1160 receives an object that appears on the interactive screen of the first touch panel 630 from the image forming apparatus 60. The control unit 1160 displays the received object on the second touch panel 1110.

If the received object is a menu item to perform a function of the image forming apparatus 60, the control unit 1160 receives a menu identifier corresponding to the menu item from the image forming apparatus 60. The control unit 1160 searches to find an icon corresponding to the menu identifier in the mobile terminal 20, and displays the menu item on the second touch panel 1110 using the searched icon.

If the received object is predetermined content stored in the image forming apparatus 60, the control unit 1160 may execute an application to view or edit the received content. The received content may be stored in the mobile terminal 20.

The control unit 1160, when transmitting and receiving the content or the menu item with the image forming apparatus 60, may display, on the second touch panel 1110, a graphic image representing movement of the content or the menu item.

Referring to FIG. 10, once the user touches one of the menu items 220, for example, the menu item 215 on the mobile terminal 20, and drags and drops the menu item 215 in a direction toward the first touch panel 630, the control unit 1160 deletes the menu item 215 from the screen of the mobile terminal 20. The control unit 1160 may transmit a menu item corresponding to the menu item 215 to the image forming apparatus 60.

In exemplary embodiments of FIGS. 12 through 15, descriptions of components also found in FIGS. 1 through 11 will not be repeated.

Figure 12:
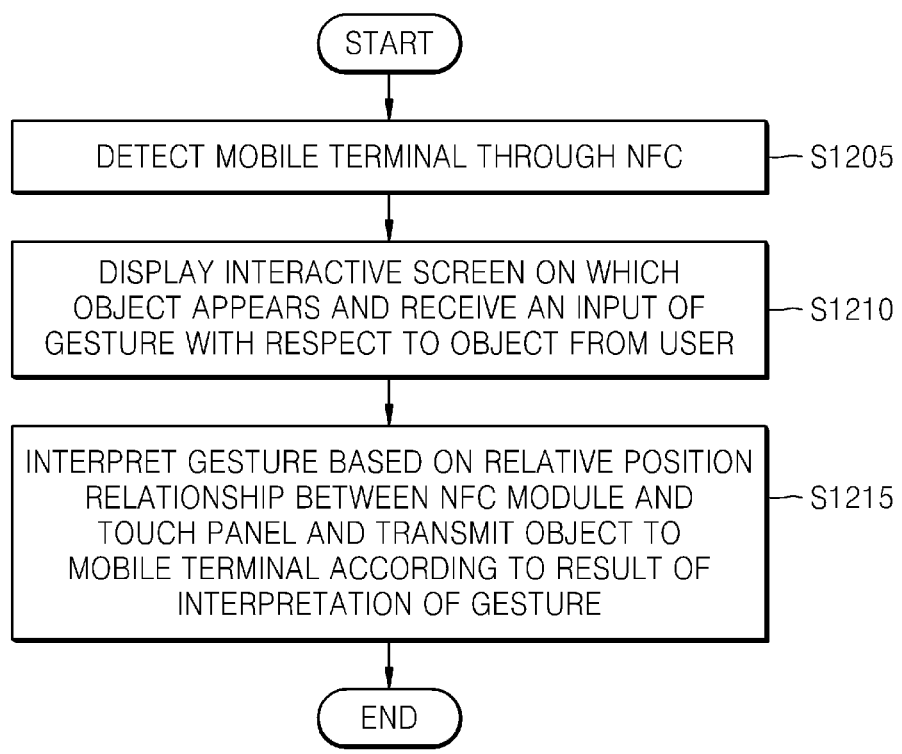
FIG. 12 is a flowchart illustrating an image forming method according to an exemplary embodiment of the present general inventive concept.

FIG. 12 is a flowchart illustrating an image forming method according to an exemplary embodiment of the present general inventive concept. Referring to FIG. 12, the image forming apparatus 60 detects the mobile terminal 20 through NFC by using the first NFC module 620 in operation S1205. According to one exemplary embodiment, the image forming apparatus 60 may determine a relative position relationship between the first NFC module 620 and the first touch panel 630 to establish a location of the mobile terminal 20 with respect to the image forming apparatus 60.

In operation S1210, the image forming apparatus 60 displays an interactive screen on which at least one object appears through the first touch panel 630 and senses a gesture with respect to the object from the user.

In operation S1215, the image forming apparatus 60 interprets the gesture of the user based on the relative position relationship between the first NFC module 620 and the first touch panel 630, and transmits the object to the mobile terminal 20 according to the result of an interpretation of the gesture.

Figure 13:
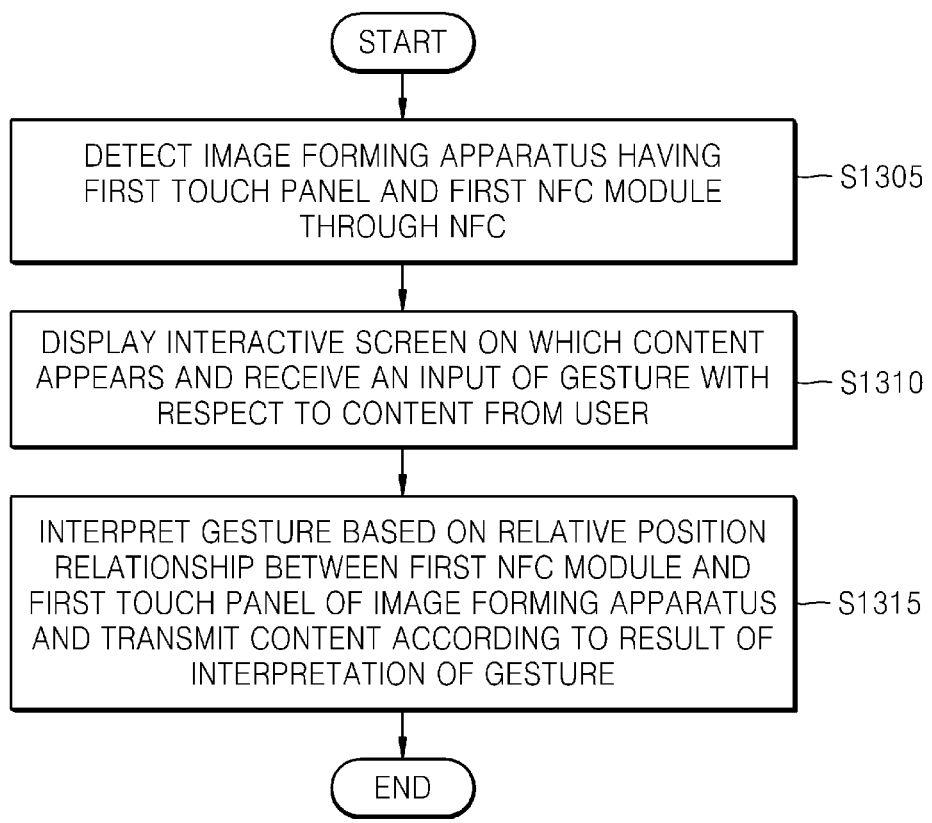
FIG. 13 is a flowchart illustrating a method of a mobile terminal to transmit data to and receive data from an image forming apparatus according to an exemplary embodiment of the present general inventive concept.

FIG. 13 is a flowchart illustrating a method of the mobile terminal 20 to transmit data to and receive data from the image forming apparatus 60 according to an exemplary embodiment of the present general inventive concept.

Referring to FIG. 13, the mobile terminal 20 detects the image forming apparatus 60 having the first touch panel 630 and the first NFC module 620 through NFC in operation S1305.

The mobile terminal 20 displays an interactive screen on which at least one content appears and receives an input of a gesture with respect to the content from the user in operation S1310.

The mobile terminal 20 interprets the gesture of the user based on the relative position relationship between the first NFC module 620 and the first touch panel 630 of the image forming apparatus 60, and transmits the content to the image forming apparatus 60 according to a result of an interpretation of the gesture in operation S1315.

Figure 14:
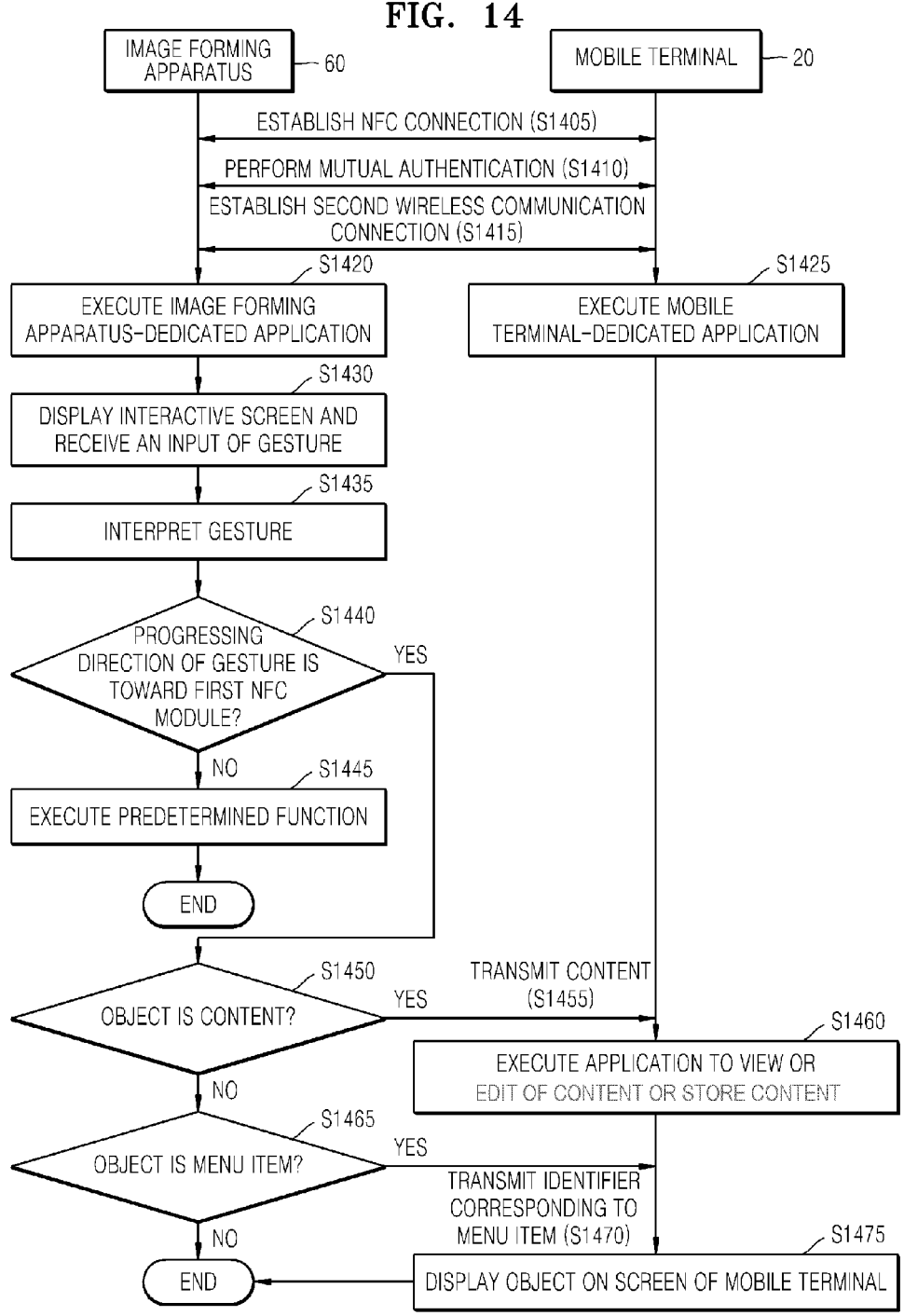
FIG. 14 is a flowchart illustrating an image forming method according to another exemplary embodiment of the present general inventive concept.

FIG. 14 is a flowchart illustrating an image forming method according to another exemplary embodiment of the present general inventive concept.

Referring to FIG. 14, the image forming apparatus 60 and the mobile terminal 20 establish an NFC connection therebetween in operation S1405. Once the mobile terminal 20 is docked on a cradle (not illustrated) including the NFC tag 30 of the image forming apparatus 60, the image forming apparatus 60 and the mobile terminal 20 establishes the NFC connection after transmitting and receiving an above-described NDEF message therebetween. The NDEF message includes information about a relative position relationship between the first NFC module 620 and the first touch panel 630 of the image forming apparatus 60, such that the mobile terminal 20 may recognize a direction or distance of the first touch panel 630 of the image forming apparatus 60 with respect to or from the cradle on which the mobile terminal 20 is docked.

The image forming apparatus 60 and the mobile terminal 20 perform mutual authentication in operation S1410. Mutual authentication may include user authentication or device authentication described above. Depending on an exemplary embodiment, operation S1410 may be performed after operation S1415.

The image forming apparatus 60 and the mobile terminal 20 establish second wireless communication connection by using NFC connection in operation S1415. The image forming apparatus 60 and the mobile terminal 20 transmit and receive information necessary to perform a second wireless communication connection through the NFC connection. Security information, such as a password to perform the second wireless communication, or identification information to identify the second wireless communication may be the information necessary to perform the second wireless communication connection.

The image forming apparatus 60 and the mobile terminal 20 execute their dedicated applications in operations S1420 and S1425, respectively. Herein, the dedicated application refers to a dedicated program to execute the image forming method according to the present general inventive concept, and the dedicated application may be executed as a background in the image forming apparatus 60 and the mobile terminal 20. If the dedicated application is not installed on the mobile terminal 20, the image forming apparatus 60 may provide an installation program corresponding to the dedicated application of the mobile terminal 20 or a URL of a web server in which the installation program exists to the mobile terminal 20, thereby automatically installing the dedicated application on the mobile terminal 20. Depending on an exemplary embodiment, operations S1420 and S1425 to execute the dedicated applications may be performed prior to operation S1405, operation S1410, or operation S1415. For example, if operations S1420 and S1425 are performed prior to S1405, the dedicated applications may further include a function to perform operations S1405 through S1415.

The image forming apparatus 60 displays an interactive screen on which at least one object appears, and receives an input of a gesture from the user in operation S1430.

In operation S1435, the image forming apparatus 60 interprets the input user's gesture based on a relative position relationship between the first NFC module 620 and the first touch panel 630. The relative position relationship between the first NFC module 620 and the first touch panel 630 may be previously stored in the image forming apparatus 60.

The image forming apparatus 60 determines whether the gesture progresses in a direction from the first touch panel 630 to the first NFC module 620 in operation S1440.

If the gesture progresses in a direction other than the direction from the first touch panel 630 to the first NFC module 620, then the image forming apparatus 60 performs a predetermined job mapped to the progressing direction of the gesture in operation S1445. The image forming apparatus 60 may perform a job, such as, but not limited to, turning over the interactive screen to the next page or displaying other objects on the interactive screen. In the present embodiment, for convenience of description, only the progressing direction of the gesture has been considered, but the number of touches in the gesture, the speed of the gesture, and the contact area of the gesture may be further considered.

In operation S1450, the image forming apparatus 60 determines whether the object selected by the user is content, if the gesture progresses in the direction from the first touch panel 630 to the first NFC module 620.

If determining that the object is content, the image forming apparatus 60 transmits the content to the mobile terminal 20 in operation S1445.

The mobile terminal 20 executes an application to view or edit the received content or stores the content in the mobile terminal 20 in operation S1460. However, depending on an exemplary embodiment, another job using the content may also be performed in the mobile terminal 20.

If the object is determined to not be content, the image forming apparatus 60 determines whether the object is a menu item in operation S1465.

If the object is determined to be the menu item, the image forming apparatus 60 transmits a menu identifier corresponding to the menu item to the mobile terminal in operation S1470.

The mobile terminal 20 displays the same object as the menu item selected in the image forming apparatus 60 or a size-reduced shortcut of the menu item on the screen of the mobile terminal 20 in operation S1475.

Figure 15:
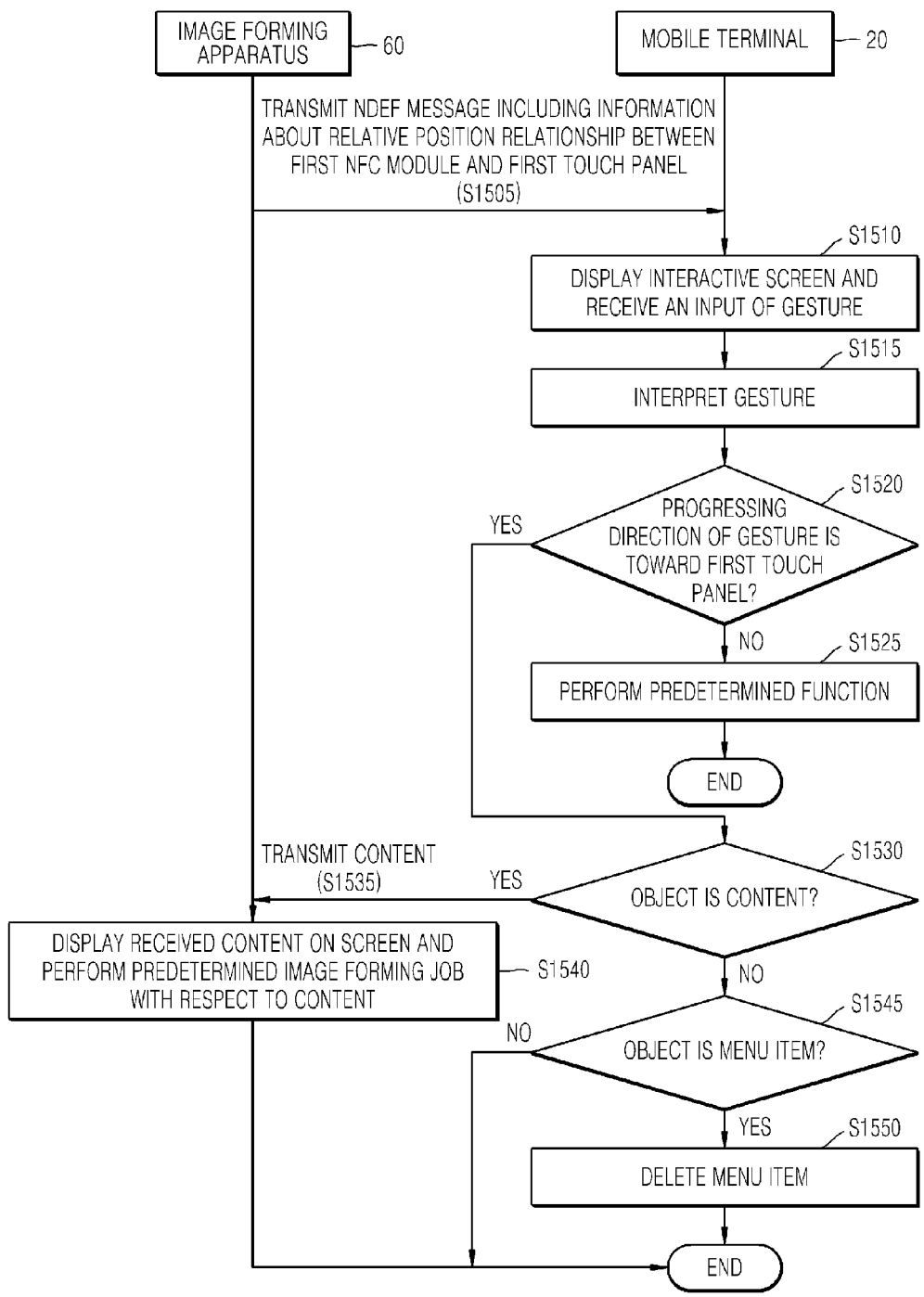
FIG. 15 is a flowchart illustrating an image forming method according to another exemplary embodiment of the present general inventive concept.

FIG. 15 is a flowchart illustrating an image forming method according to another exemplary embodiment of the present general inventive concept. In an exemplary embodiment of FIG. 15, it is assumed that operations S1405 through S1425 illustrated in FIG. 14 are assumed to have already been performed. However, operation S1505 is illustrated to emphasize transmission and reception of the NDEF message of operation S1405.

The mobile terminal 20 displays the interactive screen on which at least one object appears, and receives an input of a gesture with respect to the object from the user, in operation S1510.

The mobile terminal 20 interprets the user's gesture based on the relative position relationship between the first NFC module 620 and the first touch panel 630 of the image forming apparatus 60 in operation 51515.

The mobile terminal 20 determines whether the gesture progresses in a direction from the first NFC module 620 of the image forming apparatus 60 to the first touch panel 630 of the image forming apparatus 60 in operation S1520. That is, the mobile terminal 20 determines whether the user's gesture input to the mobile terminal 20 is directed toward the first touch panel 630 of the image forming apparatus 60.

If the gesture progresses in a direction other than the direction from the first NFC module 620 of the image forming apparatus 60 to the first touch panel 630 of the image forming apparatus 60, the mobile terminal 20 performs a predetermined job corresponding to the progressing direction of the gesture in operation S1525. The predetermined job may be, but not limited to, deletion of content or a page change of the interactive screen.

If the gesture progresses in the direction from the first NFC module 62 of the image forming apparatus 60 to the first touch panel 630 of the image forming apparatus 60, the mobile terminal 20 determines whether the object is content in operation S1530.

If the object is content, the mobile terminal 20 transmits the content to the image forming apparatus 60 in operation S1535.

The image forming apparatus 60 displays the received content son the first touch panel 630 of the image forming apparatus 60 and performs an image forming job with respect to the content in operation S1540.

If the object is not content, the mobile terminal 20 determines whether the object is a menu item in operation S1545. Herein, the menu item may include a menu item displayed on the mobile terminal 20 through operations S1470 and S1475.

If the object is the menu item, the mobile terminal 20 deletes the menu item from the interactive screen of the mobile terminal 20 in operation S1550. That is, upon input of a gesture of moving the menu item displayed on the interactive screen of the mobile terminal 20 toward the first touch panel 630 of the image forming apparatus 60, the menu item is deleted from the mobile terminal 20. As such, a menu identifier corresponding to the menu item may be transmitted to the image forming apparatus 60. However, deletion of the menu item corresponds to an embodiment and thus the true scope of the present general inventive concept is not limited thereto.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM). CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

While the present general inventive concept has been particularly shown and described with reference to embodiments thereof, it will be understood by one of ordinary skill in the art that various changes in form and detail may be made therein without departing from the spirit and scope of the present general inventive concept as defined by the following claims. Accordingly, the disclosed embodiments should be considered in a descriptive sense and not in a restrictive sense. The scope of the present general inventive concept will be defined by the appended claims, and differences in scope equivalent to the appended claims should be construed as being included in the present general inventive concept.

What is claimed is:

1. An image forming apparatus having at least one of print, scan, copy, fax, and web browsing functions, the image forming apparatus comprising:
   a near field communication (NFC) module configured to detect a mobile terminal through NFC;
   a touch panel configured to:
      display an interactive screen on which at least one object appears, and
      receive an input of a gesture of a user regarding the object with respect to the mobile terminal; and
   a control unit to:
      determine a relative position relationship between the NFC module and the touch panel to establish a location of the mobile terminal with respect to the image forming apparatus, and
      interpret the gesture from the user to transmit the object from the image forming apparatus to the mobile terminal according to a result of the interpretation of the gesture based on the relative position relationship.

2. The image forming apparatus of claim 1, wherein the control unit is further configured to transmit the object to the mobile terminal, if the gesture progresses in a direction from the touch panel to the NFC module.

3. The image forming apparatus of claim 1,
   wherein the object appearing on the interactive screen is one of content stored in the image forming apparatus or a menu item corresponding to a function of the image forming apparatus, and
   wherein the content comprises at least one of a fax document, a scanned document, an e-mail, and a file stored in a document box.

4. The image forming apparatus of claim 3, wherein, if the object is the menu item corresponding to the function, the control unit is further configured to:
   transmit a menu identifier corresponding to the menu item to the mobile terminal, and
   request the mobile terminal to display the menu item on a screen of the mobile terminal.

5. The image forming apparatus of claim 3, wherein, if the object is the content, the control unit is further configured to request the mobile terminal to store the content or to execute an application to view or edit the content.

6. The image forming apparatus of claim 3, wherein, if the object is the content, the control unit is further configured to:
   transmit thumbnail or summary information of the content according to a data rate of the content, or
   resize the content prior to transmission of the content.

7. The image forming apparatus of claim 1, further comprising:
   a wireless communication module to perform second wireless communication having a higher data rate than that of the NFC,
   wherein, once the NFC module detects the mobile terminal, the control unit is further configured to:
      establish the second wireless communication connection by using the NFC, and
      transmit the object to the mobile terminal through the established second wireless communication connection.

8. The image forming apparatus of claim 7, wherein the control unit is further configured to perform user authentication with respect to the mobile terminal through the NFC or the second wireless communication connection.

9. The image forming apparatus of claim 1, wherein, once a user's gesture progressing in a direction from the NFC module to the touch panel is detected in the mobile terminal, the control unit is further configured to:
receive a predetermined content displayed on a screen of the mobile terminal from the mobile terminal, and
display the received predetermined content on the interactive screen.

10. The image forming apparatus of claim 9, wherein the control unit is further configured to perform a print job, a fax transmission job, a storing job in a document box, or an e-mail transmission job with respect to the received predetermined content.

11. The image forming apparatus of claim 9, wherein the control unit is further configured to display, on the interactive screen, a graphic image representing movement of the content from an outer side of the interactive screen to an inner side of the interactive screen.

12. An image forming method for an image forming apparatus having a near field communication (NFC) module and a touch panel, the image forming method comprising:
detecting a mobile terminal through NFC using the NFC module;
determining a relative position relationship between the NFC module and the touch panel to establish a location of the mobile terminal with respect to the image forming apparatus;
displaying an interactive screen on which at least one object appears, through the touch panel, and sensing a user's gesture with respect to the object; and
interpreting the user's gesture to transmit the object to the mobile terminal according to a result of the interpretation of the gesture based on the relative position relationship.

13. The image forming method of claim 12, wherein the transmitting of the object comprises transmitting the object to the mobile terminal if the gesture progresses in a direction from the touch panel to the NFC module.

14. The image forming method of claim 12,
wherein the object appearing on the interactive screen is one of content stored in the image forming apparatus or a menu item to perform a function of the image forming apparatus, and
wherein the content comprises at least one of a fax document, a scanned document, an e-mail, and a file stored in a document box.

15. The image forming method of claim 14, wherein the transmitting of the object if the object is the menu item corresponding to the function comprises:
transmitting a menu identifier corresponding to the menu item to the mobile terminal; and
requesting the mobile terminal to display the menu item on a screen of the mobile terminal.

16. The image forming method of claim 15, wherein the transmitting of the object if the object is the content comprises requesting the mobile terminal to store the content or to execute an application to view or edit the content.

17. The image forming method of claim 12, further comprising:
establishing second wireless communication connection having a higher data rate than that of the NFC by using the NFC when the mobile terminal is detected by the NFC module,
wherein the transmitting of the object comprises transmitting the object to the mobile terminal through the established second wireless communication connection.

18. The image forming method of claim 17, further comprising performing user authentication with respect to the mobile terminal through the NFC or the second wireless communication connection.

19. The image forming method of claim 12, further comprising:
receiving a predetermined content displayed on a screen of the mobile terminal from the mobile terminal, once a user's gesture progressing in a direction from the NFC module to the touch panel is sensed in the mobile terminal;
displaying the received predetermined content on the interactive screen; and
performing a print job, a fax transmission job, a storing job in a document box, or an e-mail transmission job with respect to the received predetermined content.

20. The image forming method of claim 19, wherein the displaying of the received predetermined content on the interactive screen comprises displaying, on the interactive screen, a graphic image representing movement of the content from an outer side of the interactive screen to an inner side of the interactive screen.

21. A mobile terminal supporting near field communication (NFC), the mobile terminal comprising:
a second NFC module configured to detect an image forming apparatus having a first touch panel and a first NFC module through the NFC;
a second touch panel configured to:
display an interactive screen on which at least one content appears, and
receive an input of a gesture with respect to the content from a user; and
a control unit configured to:
determine a relative position relationship between the first NFC module and the first touch panel to establish a location of the mobile terminal with respect to the image forming apparatus, and
interpret the gesture from the user to transmit the object from the mobile terminal to the image forming apparatus according to a result of the interpretation of the gesture based on the relative position relationship.

22. The mobile terminal of claim 21, wherein the control unit is further configured to:
receive an NFC data exchange format (NDEF) message including information about the relative position relationship between the first NFC module and the first touch panel through the second NFC module, and
transmit the content to the image forming apparatus if the gesture progresses in a direction from the first NFC module of the image forming apparatus to the first touch panel of the image forming apparatus.

23. The mobile terminal of claim 21,
wherein the content comprises at least one of a still image, a video image, a screen shot, a document, an e-mail, and an address book which are stored in the mobile terminal, a hypertext transfer protocol (HTTP) object or a uniform resource locator (URL) included in a web page, and
wherein the control unit transmits thumbnail or summary information of the content according to a data rate of the content or resize the content prior to transmission of the content.

24. The mobile terminal of claim 21, wherein the control unit is further configured to request the image forming apparatus to request perform a print job, a fax transmission job, a storing job in a document box, or an e-mail transmission job with respect to the content.

25. The mobile terminal of claim 21, further comprising a second wireless communication module to perform second wireless communication having a higher data rate than that of the NFC,
wherein, once the second NFC module detects the image forming apparatus, the control unit is further configured to:
establish a second wireless communication connection by using the NFC, and
transmit the content to the image forming apparatus through the established second wireless communication connection.

26. The mobile terminal of claim 21, wherein, if the image forming apparatus senses a user's gesture progressing in a direction from the first touch panel to the first NFC module, the control unit is further configured to:
receive an object which appears on an interactive screen of the first touch panel from the image forming apparatus, and
display the received object on the second touch panel.

27. The mobile terminal of claim 26, wherein, if the received object is a menu item corresponding to a function of the image forming apparatus, the control unit is further configured to:
receive a menu identifier corresponding to the menu item from the image forming apparatus, and
display the menu item on the second touch panel.

28. The mobile terminal of claim 26, wherein, if the received object is a predetermined content stored in the image forming apparatus, the control unit is further configured to:
store the predetermined content, or
execute an application to view or edit the predetermined content.

29. A method of transmitting and receiving data to and from an image forming apparatus at a mobile terminal supporting near field communication (NFC), the method comprising:
detecting the image forming apparatus having a first touch panel and a first NFC module through the NFC using a second NFC module;
determining a relative position relationship between the first NFC module and the first touch panel to establish a location of the mobile terminal with respect to the image forming apparatus;
displaying an interactive screen on which at least one content appears through a second touch panel and receiving an input of a gesture with respect to the content from a user; and
interpreting the user's gesture to transmit the content to the image forming apparatus according to a result of interpretation of the gesture based on the relative position relationship.

30. An image forming apparatus supporting near field communication (NFC), comprising:
a near field communication (NFC) module configured to detect an external mobile terminal through NFC; and
a user interface configured to allow a user to transmit an object between the image forming apparatus and the external mobile terminal via a gesture of the user corresponding to the image forming apparatus and the external mobile terminal and based on a position of the external mobile terminal with respect to the image forming apparatus,
wherein the position of the mobile terminal with respect to the image forming apparatus corresponds to a position of the NFC module with respect to the user interface.

31. The image forming apparatus of claim 30, further comprising:
a control unit to associate a position of the NFC module with respect to the user interface with the position of the external mobile terminal with respect to the image forming apparatus.

32. The image forming apparatus of claim 31, wherein the control unit interprets the gesture of the user based on at least one of a distance and direction of the external mobile terminal with respect to the image forming apparatus and to control the transmission of the object based on the interpretation.

33. The image forming apparatus of claim 30,
wherein the user interface allows the user to transmit the object from the image forming apparatus to the external mobile terminal based on the gesture, and
wherein the user interface allows a user to receive the object from the external mobile terminal based on another gesture of the user that is substantially opposite from the gesture.

* * * * *